United States Patent
Yang et al.

(10) Patent No.: US 12,492,740 B2
(45) Date of Patent: Dec. 9, 2025

(54) SPEED REDUCER, JOINT ASSEMBLY AND ELECTRIC PENDULUM

(71) Applicant: T-MAX (HANGZHOU) TECHNOLOGY CO., LTD., Hangzhou (CN)

(72) Inventors: Huizhong Yang, Hangzhou (CN); Yilin Yang, Hangzhou (CN)

(73) Assignee: T-MAX (HANGZHOU) TECHNOLOGY, CO., LTD., Zhejiang (CN)

(*) Notice: Subject to any disclaimer, the term of this patent is extended or adjusted under 35 U.S.C. 154(b) by 0 days.

(21) Appl. No.: 18/605,698

(22) Filed: Mar. 14, 2024

(65) Prior Publication Data
US 2025/0251034 A1    Aug. 7, 2025

Related U.S. Application Data

(63) Continuation of application No. PCT/CN2024/075476, filed on Feb. 2, 2024.

(30) Foreign Application Priority Data

Mar. 14, 2023  (CN) .......................... 202310270440.8
Feb. 2, 2024  (WO) ................ PCT/CN2024/075476

(51) Int. Cl.
*F16H 19/08*  (2006.01)
*B25J 9/10*  (2006.01)

(52) U.S. Cl.
CPC .............. *F16H 19/08* (2013.01); *B25J 9/102* (2013.01)

(58) Field of Classification Search
CPC .................................. F16H 19/08; B25J 9/102
(Continued)

(56) References Cited

U.S. PATENT DOCUMENTS

| | | | |
|---|---|---|---|
| 2013/0048443 A1* | 2/2013 | Muramatsu | F16D 65/18 188/72.1 |
| 2023/0322131 A1* | 10/2023 | Hirose | F16H 19/08 74/89 |

FOREIGN PATENT DOCUMENTS

| | | |
|---|---|---|
| CN | 101379318 A | 3/2009 |
| CN | 106494273 A | 3/2017 |

(Continued)

OTHER PUBLICATIONS

International Search Report and Written Opinion of the International Searching Authority for PCT International Application No. PCT/CN2024/075476 mailed Apr. 4, 2024, 20 pages with English translation.

*Primary Examiner* — T. Scott Fix
(74) *Attorney, Agent, or Firm* — Perkins Coie LLP

(57) ABSTRACT

A joint assembly includes a speed reducer and a motor. The speed reducer includes a housing, an internal gear; an external gear at least partially arranged in an internal gear hole of the internal gear and meshing with the internal gear; an eccentric wheel rotatably and at least partially arranged in an external gear hole of the external gear; a limiting disc; and a drive member. A rotation axis of the eccentric wheel is coaxial with a central axis of the internal gear. The eccentric wheel drives the external gear to revolve around the rotation axis of the eccentric wheel. The drive member is driven to rotate by the motor. The drive member drives the eccentric wheel to rotate and hence drives the external gear to revolve around the rotation axis of the eccentric wheel in the internal gear hole of the internal gear, driving the internal gear to rotate.

20 Claims, 15 Drawing Sheets

(58) Field of Classification Search
USPC .......................................................... 74/89.14
See application file for complete search history.

(56) References Cited

FOREIGN PATENT DOCUMENTS

| | | | |
|---|---|---|---|
| CN | 107559388 A | | 1/2018 |
| CN | 115571028 A | | 1/2023 |
| CN | 218228728 U | | 1/2023 |
| CN | 116439933 A | | 7/2023 |
| JP | 2009207264 A | * | 9/2009 |
| JP | 2018096386 A | | 6/2018 |

* cited by examiner

SPEED REDUCER, JOINT ASSEMBLY AND ELECTRIC PENDULUM

CROSS-REFERENCE TO RELATED APPLICATIONS

The present disclosure claims priority to and benefits of Chinese Patent Application No. 2023102704408, filed on Mar. 14, 2023, and PCT Application PCT/CN2024/075476, filed on Feb. 2, 2024. The entire contents of the aforementioned patent documents are incorporated by reference for all purposes.

TECHNICAL FIELD

The present disclosure relates to the field of robots and, more particularly, to a speed reducer, a joint assembly, an electric pendulum, a robotic arm, a robot, a production system, and electric equipment.

BACKGROUND

A speed reducer is mainly used to reduce a speed and increase an output torque, and realizes adjustment of a desired speed in equipment or engineering by changing a speed relationship between a power source (usually a motor) and a working machine. At present, speed reducers are widely applied in electromechanical equipment such as cranes, drive joints of robots, and winches. In the related art, the speed reducers generally have problems such as complex structure, large size, small torque density, and low load capacity, which restrict their application scenarios.

SUMMARY

A speed reducer according to some example embodiments of the present technology includes: a housing; an internal gear rotatably and at least partially supported in the housing, the internal gear having an internal gear hole; an external gear at least partially arranged in the internal gear hole and meshing with the internal gear to drive the internal gear to rotate, the external gear having an external gear hole; an eccentric wheel rotatably and at least partially arranged in the external gear hole, a rotation axis of the eccentric wheel being coaxial with a central axis of the internal gear, and the eccentric wheel being configured to drive the external gear to revolve around the rotation axis of the eccentric wheel; a limiting disc arranged in the housing, the limiting disc being engaged with the housing so that the limiting disc and the housing are limited to relative movement in a first direction, and the limiting disc being engaged with the external gear so that the limiting disc and the external gear are limited to relative movement in a second direction, wherein the first direction, the second direction, and an axial direction of the limiting disc are orthogonal to each other; and a drive member connected to the eccentric wheel to drive the eccentric wheel to rotate.

A joint assembly according to some example embodiments of the present technology includes a speed reducer and a motor. The speed reducer includes: a housing; an internal gear rotatably and at least partially supported in the housing, the internal gear having an internal gear hole; an external gear at least partially arranged in the internal gear hole and meshing with the internal gear to drive the internal gear to rotate, the external gear having an external gear hole; an eccentric wheel rotatably and at least partially arranged in the external gear hole, a rotation axis of the eccentric wheel being coaxial with a central axis of the internal gear, and the eccentric wheel being configured to drive the external gear to revolve around the rotation axis of the eccentric wheel; a limiting disc arranged in the housing, the limiting disc being engaged with the housing so that the limiting disc and the housing are limited to relative movement in a first direction, and the limiting disc being engaged with the external gear so that the limiting disc and the external gear are limited to relative movement in a second direction, wherein the first direction, the second direction, and an axial direction of the limiting disc are orthogonal to each other; and a drive member connected to the eccentric wheel to drive the eccentric wheel to rotate. The motor is configured to drive the drive member to rotate.

An electric pendulum according to some example embodiments of the present technology includes a joint assembly and a swing arm. The joint assembly includes a speed reducer and a motor. The speed reducer includes: a housing; an internal gear rotatably and at least partially supported in the housing, the internal gear having an internal gear hole; an external gear at least partially arranged in the internal gear hole and meshing with the internal gear to drive the internal gear to rotate, the external gear having an external gear hole; an eccentric wheel rotatably and at least partially arranged in the external gear hole, a rotation axis of the eccentric wheel being coaxial with a central axis of the internal gear, and the eccentric wheel being configured to drive the external gear to revolve around the rotation axis of the eccentric wheel; a limiting disc arranged in the housing, the limiting disc being engaged with the housing so that the limiting disc and the housing are limited to relative movement in a first direction, and the limiting disc being engaged with the external gear so that the limiting disc and the external gear are limited to relative movement in a second direction, wherein the first direction, the second direction, and an axial direction of the limiting disc are orthogonal to each other; and a drive member connected to the eccentric wheel to drive the eccentric wheel to rotate. The motor is configured to drive the drive member to rotate. The swing arm is connected to the internal gear to be driven to swing by the internal gear.

The subject matter described in this patent document can be implemented in specific ways that provide one or more of the following features.

DETAILED DESCRIPTION

Figure 1:
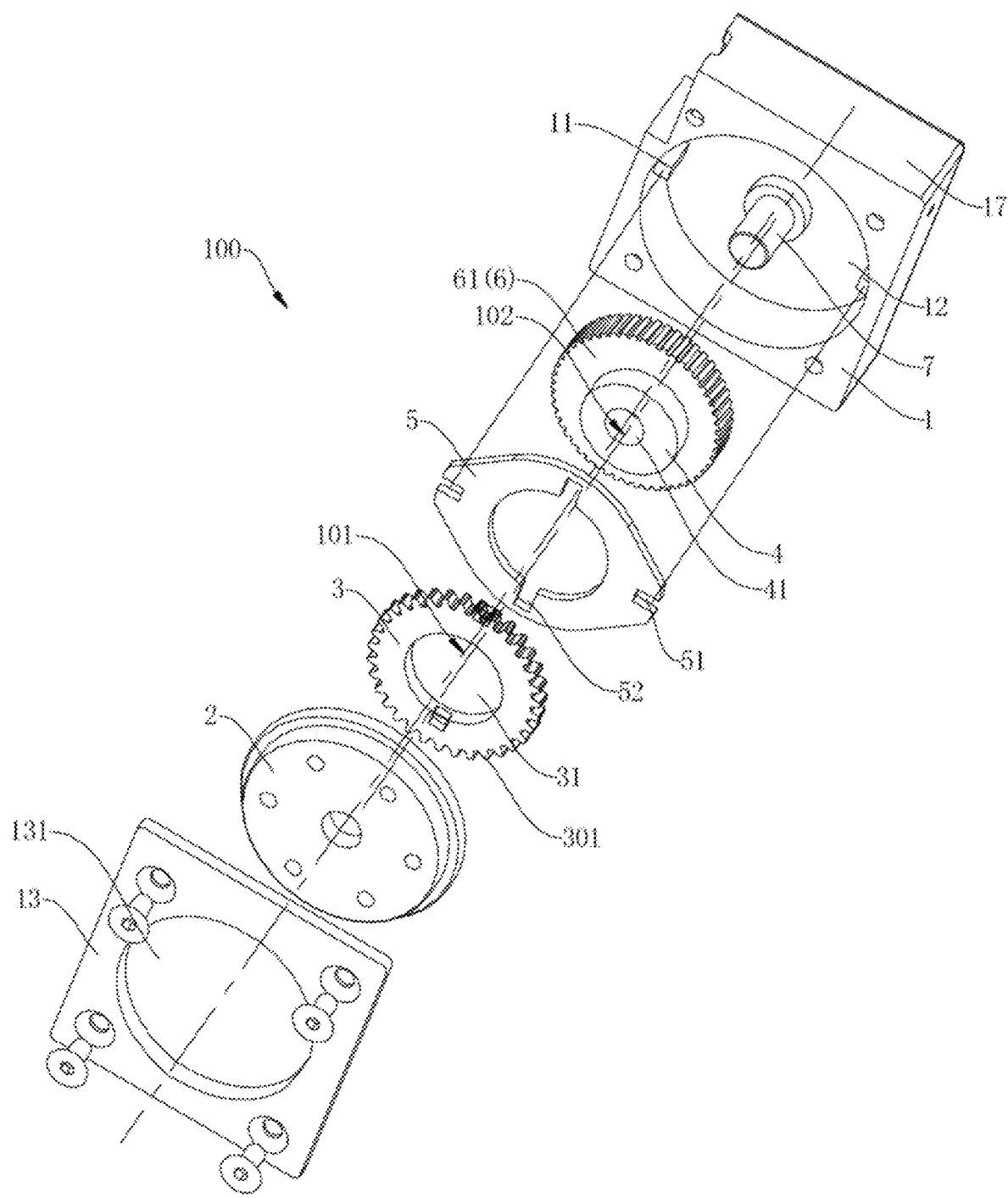
FIG. 1 is a perspective view of a speed reducer according to example embodiments of the present technology.

Embodiments of the present technology are described in detail below, examples of which are shown in the accompanying drawings. The following embodiments described with reference to the accompanying drawing are illustrative. It should be understood that the embodiments described are intended to explain the present technology rather than limit the present technology in the present disclosure.

As shown in FIGS. 1 to 5, a speed reducer according to some example embodiments of the present technology includes a housing 1, an internal gear 2, an external gear 3, an eccentric wheel 4, a limiting disc 5, and a drive member 6.

The internal gear 2 is rotatably and at least partially supported in the housing 1, the internal gear 2 has a concentric internal gear hole 21, and internal teeth 201 are arranged on a peripheral surface of the internal gear hole 21. It should be understood that the concentric internal gear hole 21 means a central axis of an outer peripheral surface of the internal gear 2 (also known as a central axis of the internal gear 2) being coaxial with a central axis of the internal gear hole 21, and a rotation axis of the internal gear 2 being coaxial with the central axis of the internal gear hole 21.

Figure 4:
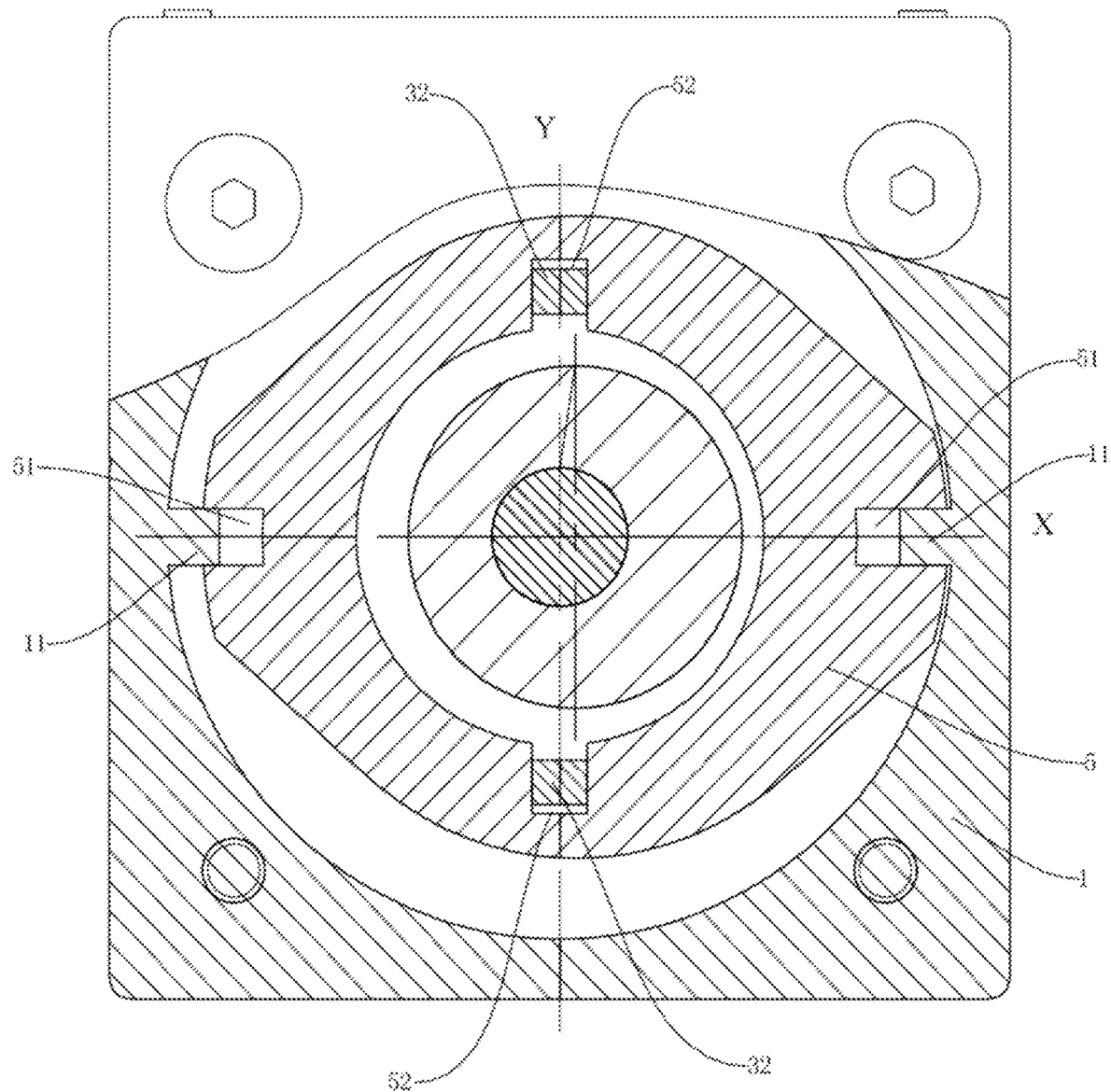
FIG. 4 is a sectional view of the speed reducer according to example embodiments of the present technology taken along line A-A in FIG. 3.

External teeth 301 are arranged on a peripheral surface of the external gear 3, and at least a part of the external gear 3 is arranged in the internal gear hole 21 and meshes with the internal gear 2 to drive the internal gear 2 to rotate. The external gear 3 has a concentric external gear hole 31, that is, a central axis of an outer peripheral surface of the external gear 3 (also known as a central axis of the external gear 3) is coaxial with a central axis of the external gear hole 31. As shown in FIG. 4, the external gear 3 is eccentrically arranged relative to the internal gear hole 21, that is, the central axis of the external gear 3 is parallel to but not coaxial with the central axis of the internal gear 2 (i.e., the central axis of the internal gear hole 21), and part of the external teeth 301 of the external gear 3 meshes with part of the internal teeth 201 of the internal gear 2.

The eccentric wheel 4 is rotatably and at least partially arranged in the external gear hole 31, a central axis of an outer peripheral surface of the eccentric wheel 4 is coaxial with the central axis of the external gear hole 31, the central axis of the outer peripheral surface of the eccentric wheel 4 is parallel to but not coaxial with a rotation axis of the eccentric wheel 4, and the rotation axis of the eccentric wheel 4 is coaxial with the central axis of the internal gear 2 (i.e., the central axis of the internal gear hole 21). The eccentric wheel 4 may drive the external gear 3 to revolve around the rotation axis of the eccentric wheel 4 (i.e., the central axis of the internal gear 2, and the central axis of the internal gear hole 21), and then drive the internal gear 2 to rotate around its central axis. Herein, it should be understood that the eccentric wheel 4 means eccentricity of the outer peripheral surface of the eccentric wheel 4 with respect to the rotation axis of the eccentric wheel 4.

For example, the eccentric wheel 4 rotates clockwise, drives the external gear 3 to revolve around the rotation axis of the eccentric wheel 4 in a clockwise direction, and the external gear 3 drives the internal gear 2 to rotate clockwise by meshing with the internal gear 2. The eccentric wheel 4 rotates counterclockwise, drives the external gear 3 to revolve around the rotation axis of the eccentric wheel 4 in a counterclockwise direction, and then drives the internal gear 2 to rotate counterclockwise.

The limiting disc 5 is arranged in the housing 1, and the limiting disc 5 is engaged with the housing 1, so that the limiting disc 5 and the housing 1 are limited to relative movement in a first direction. The limiting disc 5 is engaged with the external gear 3, so that the limiting disc 5 and the external gear 3 are limited to relative movement in a second direction, in which the first direction and the second direction are orthogonal to an axial direction of the limiting disc 5, that is, a plane limited by the first direction and the second direction is orthogonal to the axial direction of the limiting disc 5. The axial direction of the limiting disc 5 may be parallel to an axial direction of the internal gear 2, an axial direction of the external gear 3 and an axial direction of the eccentric wheel 4. In other words, the limiting disc 5 may only move relative to the housing 1 in the first direction, and the external gear 3 may only move relative to the limiting disc 5 in the second direction, so that the external gear 3 may translate relative to the housing 1 in a plane orthogonal to the axial direction of the external gear 3, while being prohibited from rotating. Due to the meshing of the external gear 3 and the internal gear 2, the external gear 3 revolves around the central axis of the internal gear hole 21 under the drive of the eccentric wheel 4, while the external gear 3 is restricted by the limiting disc 5 and cannot rotate.

The drive member 6 is connected to the eccentric wheel 4 to drive the eccentric wheel 4 to rotate. For example, the drive member 6 may be connected to a drive shaft to be driven by the drive shaft to rotate in the counterclockwise direction or in the clockwise direction; the drive shaft may be a shaft of a driver or a shaft connected to the shaft of the driver; the driver may be such as a motor; and the drive shaft may be a motor shaft.

For example, the drive member 6 is connected to the motor shaft of the motor, and when the drive member 6 is driven to rotate by the motor, the drive member 6 may drive the eccentric wheel 4 to rotate, and then may drive the external gear 3 to revolve in the internal gear hole 21 around the rotation axis of the eccentric wheel 4, thereby driving the internal gear 2 to rotate. The internal gear 2 may also be called an output gear of the speed reducer 100, and the internal gear 2 may be connected to other parts to drive other parts to rotate. For example, the internal gear 2 may be connected to a swing arm, a winch drum, and a robot joint.

It should be understood that the number of internal teeth of the internal gear 2 is greater than the number of external teeth of the external gear 3, the rotation speed of the internal gear 2 is less than the rotation speed of the eccentric wheel 4, and an output rotation speed of the speed reducer 100 is less than an input rotation speed of the speed reducer 100, so that deceleration is realized, and a larger transmission ratio is obtained.

In addition, since the external gear 3 is rotatably and at least partially fitted in the internal gear hole 21 of the internal gear 2, and the eccentric wheel 4 is rotatably and at least partially fitted in the external gear hole 31 of the external gear 3, the space occupied by the internal gear 2, the external gear 3 and the eccentric wheel 4 in the axial direction may be effectively reduced, and an axial volume of the speed reducer may be effectively reduced.

The speed reducer according to some example embodiments of the present technology has the advantages such as small size, simple structure, and large transmission ratio, and can be applied to equipment or devices with small installation space.

Figure 3:
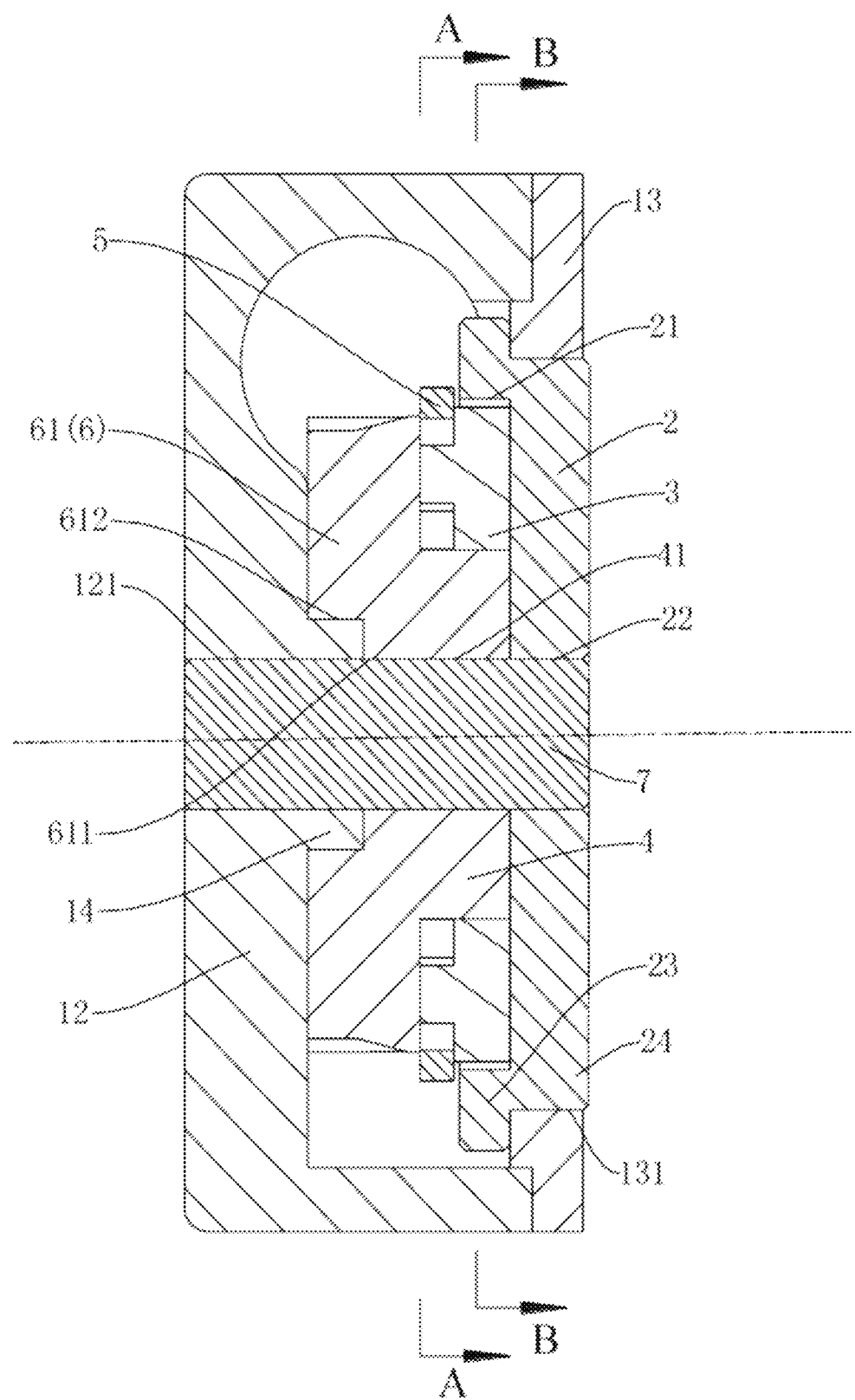
FIG. 3 is a sectional view of the speed reducer according to example embodiments of the present technology.

As shown in FIG. 1 and FIG. 3, the central axis of the internal gear 2, the central axis of the internal gear hole 21, the rotation axis of the eccentric wheel 4, the rotating axis of drive member 6 are coaxial. These axes may be collectively referred to as a main axis 101, and the main axis 101 may refer to any one of these axes in the following description. The central axis of the external gear 3, the central axis of the external gear hole 31, and the central axis of the outer peripheral surface of the eccentric wheel 4 are coaxial, these axes may be collectively referred to as an eccentric axis 102, and the eccentric axis 102 may refer to any one of these axes in the following description.

In some embodiments, one of the limiting disc 5 and the housing 1 includes a first limiting portion 11, and the other one of the limiting disc 5 and the housing 1 includes a first limiting groove 51. The first limiting portion 11 is fitted in the first limiting groove 51 and is movable along the first direction, so that the limiting disc 5 is limited to movement only in the first direction relative to the housing 1. One of the limiting disc 5 and the external gear 3 includes a second limiting portion 32, and the other one of the limiting disc 5 and the external gear 3 includes a second limiting groove 52. The second limiting portion 32 is fitted in the second limiting groove 52 and is movable along the second direction, so that the external gear 3 is limited to movement only in the second direction relative to the limiting disc 5.

In some examples, as shown in FIGS. 1 to 5, the first limiting portion 11 is arranged on an end wall 12 of the housing 1 and extends from the end wall 12 of the housing 1 along an axial direction of the housing 1 (i.e., the axial direction of the limiting disc 5, or the main axis 101) towards the limiting disc 5; and the second limiting portion 32 is arranged on the external gear 3 and extends from the external gear 3 along the main axis 101 towards the limiting disc 5.

The first limiting groove 51 and the second limiting groove 52 are on the limiting disc 5. The first limiting groove 51 is on an outer peripheral surface of the limiting disc 5 and may penetrate the limiting disc 5 along the axial direction of the limiting disc 5, and the first limiting portion 11 extends into and fits in the first limiting groove 51 along the axial direction of the limiting disc 5. The second limiting groove 52 is on an inner peripheral surface of the limiting disc 5 and may penetrate the limiting disc 5 along the axial direction of the limiting disc 5, and the second limiting portion 32 extends into and fits in the second limiting groove 52 along the axial direction of the limiting disc 5.

The first limiting groove 51 extends along the first direction (a direction where an X axis is located in FIG. 4, i.e., a left-right direction in FIG. 4), and the first limiting portion 11 is slideable in the first limiting groove 51 along the first direction; the second limiting groove 52 extends along the second direction (a direction of where a Y axis is located in FIG. 4, i.e., an up-down direction in FIG. 4), and the second limiting portion 32 is slideable in the second limiting groove 52 along the second direction.

In other examples, the limiting groove 5 has a first side surface and a second side surface opposite each other in the axial direction of limiting groove 5; the first limiting groove 51 may be on the first side surface of the limiting disc 5 and be recessed to a predetermined depth towards the second side surface; and the second limiting groove 52 may be on the second side surface of the limiting disc 5 and be recessed to a predetermined depth towards the first side surface.

As shown in FIGS. 1 to 5, there are two first limiting portions 11, two second limiting portions 32, two first limiting grooves 51 and two second limiting grooves 52. The two first limiting portions 11 are opposite in the first direction; the two first limiting grooves 51 are opposite in the first direction; and the two first limiting portions 11 fit in one-to-one correspondence in the two first limiting grooves 51. The two second limiting portions 32 are opposite in the second direction; the two second limiting grooves 52 are opposite in the second direction; and the two first second limiting portions 32 fit in one-to-one correspondence in the two second limiting grooves 52. In this way, the limiting between the limiting disc 5 and the housing 1 and between the external gear 3 and the limiting disc 5 is more stable and reliable, and the limiting structure is simpler.

As shown in FIGS. 1 to 5, the first limiting portion 11 and the second limiting portion 32 each may be a prism in shape. For example, as shown in FIGS. 1 to 4, each of the first limiting portion 11 and the second limiting portion 32 may be a quadrangular prism in shape. Each of the first limiting groove 51 and the second limiting groove 52 may be a U-shaped groove. In some embodiments, the first limiting portion 11 and the second limiting portion 32 each may be a cylindrical rod.

In the examples shown in FIGS. 1 to 5, the drive member 6 is a first gear 61, and the first gear 61 is rotatably supported in the housing 1 and is connected to the eccentric wheel 4. A rotation axis of the first gear 61 is coaxial with the rotation axis of the eccentric wheel 4; the rotation axis of the first gear 61 is coaxial with a central axis of an outer peripheral surface of the first gear 61; and the central axis of the outer peripheral surface of the first gear 61 is parallel to but not coincident with the central axis of the outer peripheral surface of the eccentric wheel 4. The first gear 61 includes a gear portion on its outer peripheral surface. The first gear 61 may mesh with the drive gear, and the drive gear drives the first gear 61 to rotate, and then drives the eccentric wheel 4 to rotate.

Figure 2:
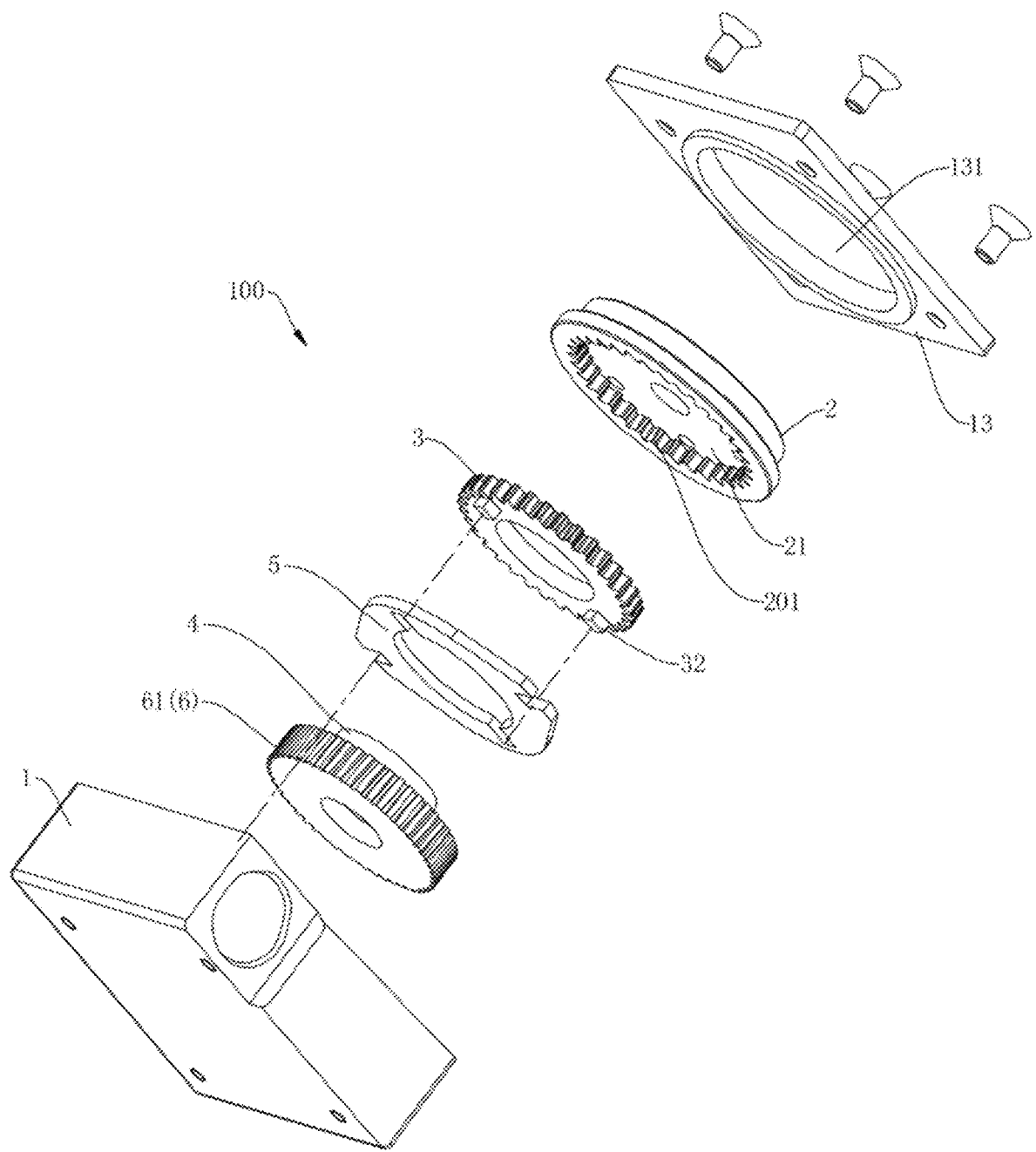
FIG. 2 is a perspective view of the speed reducer according to example embodiments of the present technology from another angle of view.

As shown in FIG. 1 and FIG. 2, the first gear 61 is connected to an end face of the eccentric wheel 4 adjacent to the end wall 12 of the housing 1 and is an integral member with the eccentric wheel 4. In some embodiments, the first gear 61 and the eccentric wheel 4 are separate members, and the first gear 61 is connected to the eccentric wheel 4 through other connection means (such as bolt connection, welding), which is not limited by the present disclosure.

It should be noted that the structure of the drive member 6 and the cooperation means of the drive member 6 and the eccentric wheel 4 are not limited to the above embodiments. For example, the drive member 6 may include a toggle block; the eccentric wheel 4 includes a toggle groove; the toggle block of the drive member 6 is movably fitted in the toggle groove of the eccentric wheel 4; and when the drive member 6 rotates, the eccentric wheel 4 is driven to rotate by the toggle block.

In some embodiments, as shown in FIGS. 1 to 5, the housing 1 has a first end (e.g., a left end in FIG. 3) and a second end (e.g., a right end in FIG. 3) opposite each other in an axial direction of the housing 1 (e.g., a left-right direction in FIG. 3). The first end of the housing 1 has the end wall 12. The second end of the housing 1 is open and is covered by a cover plate 13. The external gear 3, the eccentric wheel 4, the limiting disc 5, the first gear 61 are located in a chamber defined by the housing 1 and the cover plate 13. The cover plate 13 has a cover plate hole 131, a part of the internal gear 2 is rotatably located in the housing 1, and another part of the internal gear 2 is rotatably supported in the cover plate hole 131. A central axis of the cover plate hole 131 is coaxial with the central axis of the internal gear 2.

In some specific examples, as shown in FIG. 3, the outer peripheral surface of the internal gear 2 may be a stepped surface, so that the internal gear 2 is divided into a large diameter portion 23 and a small diameter portion 24 along the axial direction of the internal gear 2, and a diameter of the large diameter portion 23 is greater than a diameter of the small diameter portion 24. The large diameter portion 23 is rotatably located in the housing 1, and the small diameter portion 24 is rotatably fitted in the cover plate hole 131 and is in clearance fit with the cover plate 13. In some embodiments, the small diameter portion 24 is rotatably supported in the cover plate hole 131 by a bearing, and the large diameter portion 23 is rotatably supported in the housing 1 by a bearing.

As shown in FIG. 3, the large diameter portion 23 is located at a left side of the small diameter portion 24 and is coaxial with the small diameter portion 24, and the cover plate 13 is located at a right side of the large diameter portion 23 and abuts against a right end face of the large diameter portion 23 to axially limit the internal gear 2. The internal gear hole 21 is located in the large diameter portion 23, the external gear 3 extends from a left side of the internal gear 2 into the internal gear hole 21 and partially meshes with the internal gear 2, and a right end face of the external gear 3 abuts against the internal gear 2 (such as a left end face of the small diameter portion 24). The eccentric wheel 4 extends from a left side of the external gear 3 into the external gear hole 31, and a right end face of the eccentric wheel 4 is flush with the right end face of the external gear 3 and abuts against the internal gear 2 (such as the left end face of the small diameter portion 24). The first gear 61 abuts against a right end face of the end wall 12 of the housing 1. The limiting disc 5 is located between the first gear 61 and the external gear 3 in the axial direction of the limiting disc 5.

Consequently, axial positions of the internal gear 2, the external gear 3, the eccentric wheel 4, the limiting disc 5 and the first gear 61 in the housing 1 are limited, and axial movements of the gear 2, the external gear 3, the eccentric wheel 4, the limiting disc 5 and the first gear 61 during operation are avoided, so that the reducer 100 has good stability.

In order to limit radial positions of the internal gear 2, the eccentric wheel 4 and the first gear 61, and avoid radial displacement when the internal gear 2, the eccentric wheel 4 and the first gear 61 rotate, as shown in FIGS. 1 to 5, the speed reducer 100 includes a positioning shaft 7. The positioning shaft 7 is connected to the end wall 12 of the first end of the housing 1 and extends towards the second end of the housing 1 (e.g., the positioning shaft 7 in FIG. 3 extends rightwards from the end wall 12).

Figure 5:
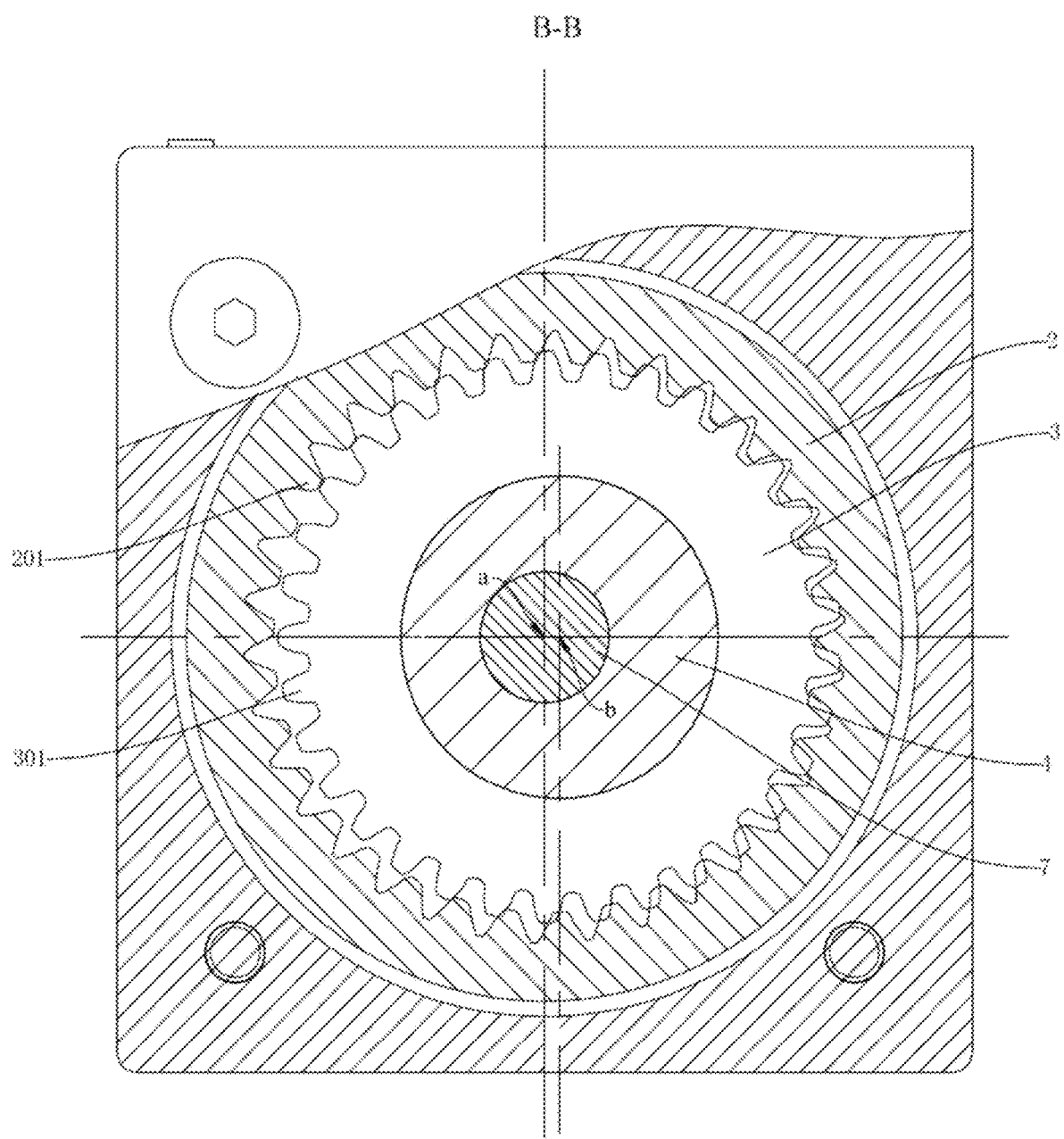
FIG. 5 is a sectional view of the speed reducer according to example embodiments of the present technology taken along line B-B in FIG. 3.

The eccentric wheel 4 has an eccentric wheel hole 41, the first gear 61 has a gear hole 611, and the internal gear 2 has a positioning hole 22; the eccentric wheel hole 41, the gear hole 611 and the positioning hole 22 are axially opposite, and are all coaxial with the internal gear 2, that is, a central axis of the eccentric wheel hole 41, a central axis of the gear hole 611 and a central axis of the positioning hole 22 are coincident with the central axis of the internal gear 2. The positioning shaft 7 is rotatably fitted in the eccentric wheel hole 41, the gear hole 611 and the positioning hole 22, that is, the internal gear 2, the eccentric wheel 4 and the first gear 61 can rotate relative to the positioning shaft 7. It should be understood that a central axis of the positioning shaft 7 are also coincident with the central axis of the internal gear 2. As shown in FIG. 5, a center of the internal gear 2, a center of the eccentric wheel hole 41, a center of the positioning shaft 7 are all a center a; and a center of the external gear 3 and a center of the outer peripheral surface of the eccentric wheel 4 are all a center b.

The positioning shaft 7 carries out radial limiting to the internal gear 2, the eccentric wheel 4 and the first gear 61, so that internal components of the speed reducer 100 are compact, stable and closely fitted.

In the example shown in FIG. 3, a middle portion of the end wall 12 of the housing 1 includes an end wall hole 121, and a left end of the positioning shaft 7 is fitted in the end wall hole 121. In some embodiments, the positioning shaft 7 and the end wall 12 of housing 1 are integrally formed.

Further, as shown in FIG. 1, the end wall 12 of the first end of the housing 1 includes a central flange 14 extending towards the second end of the housing 1, a left end face of the first gear 61 includes a positioning groove 612, a central axis of the positioning groove 612 is coaxial with the rotation axis of the eccentric wheel 4, the central axis of the first gear 61 and the central axis of the positioning axis 7, and the central flange 14 is rotatably fitted in the positioning groove 612 to further limit the radial position of the first gear 61.

In some optional embodiments, the speed reducer includes the housing 1, the internal gear 2, the external gear 3, the eccentric wheel 4, and the drive member 6.

As described above, in some examples, the drive member 6 may be configured as the first gear 61.

The internal gear 2 is rotatably and at least partially arranged in the housing 1, the internal gear 2 has the internal gear hole 21, and the central axis of the internal gear hole 21 is coaxial with the rotation axis of the internal gear 2. The external gear 3 has the external gear hole 31, the external gear 3 is at least partially arranged in the internal gear hole 21 and meshes with the internal gear 2 to drive the internal gear 2 to rotate, and the external gear 3 translates in the plane orthogonal to the axial direction of the external gear 3 and is prevented from rotating around the central axis of the external gear 3.

The eccentric wheel 4 has the eccentric wheel hole 41, and the eccentric wheel 4 is rotatably and at least partially arranged in the external gear hole 31 to drive the external gear 3 to revolve around the central axis of the eccentric wheel hole 41; the rotation axis of the eccentric wheel 4, the central axis of the eccentric wheel hole 41 and the central axis of the internal gear 2 are coaxial, and the central axis of the outer peripheral surface of the eccentric wheel 4 is eccentric relative to the central axis of the eccentric wheel hole 41. The drive member 6 is connected to the eccentric wheel 4 to drive the eccentric wheel 4 to rotate.

The speed reducer according to some example embodiments of the present technology has the advantages such as small size, simple structure, and large transmission ratio, and can be applied to equipment or devices with small installation space.

In other optional embodiments, the speed reducer includes the housing 1, the internal gear 2, the external gear 3, an eccentric member, and the drive member 6.

As described above, in some examples, the eccentric member may be configured as the eccentric wheel 4, and the drive member 6 may be configured as the first gear 61.

The internal gear 2 is rotatably and at least partially arranged in the housing 1, and the internal gear 2 has the internal gear hole 21. The external gear 3 has the external gear hole 31, and the external gear 3 is arranged in the internal gear hole 21 and meshes with the internal gear 2. The eccentric member is rotatably arranged in the external gear hole 31 to drive the external gear 3, a rotation axis of the eccentric member is coaxial with the central axis of the internal gear 2, a central axis of an outer peripheral surface of the eccentric member is eccentric relative to the rotation axis of the eccentric member, and the external gear 3 revolves around the rotation axis of the eccentric member and is prevented from rotating around the central axis of the external gear 3 to drive the internal gear 2 to rotate. The drive member 6 is connected to the eccentric wheel 4 to drive the eccentric wheel 4 to rotate.

The speed reducer according to some example embodiments of the present technology has the advantages such as small size, simple structure, and large transmission ratio, and can be applied to equipment or devices with small installation space.

A joint assembly 200 according to some example embodiments of the present technology is described below.

Figure 6:
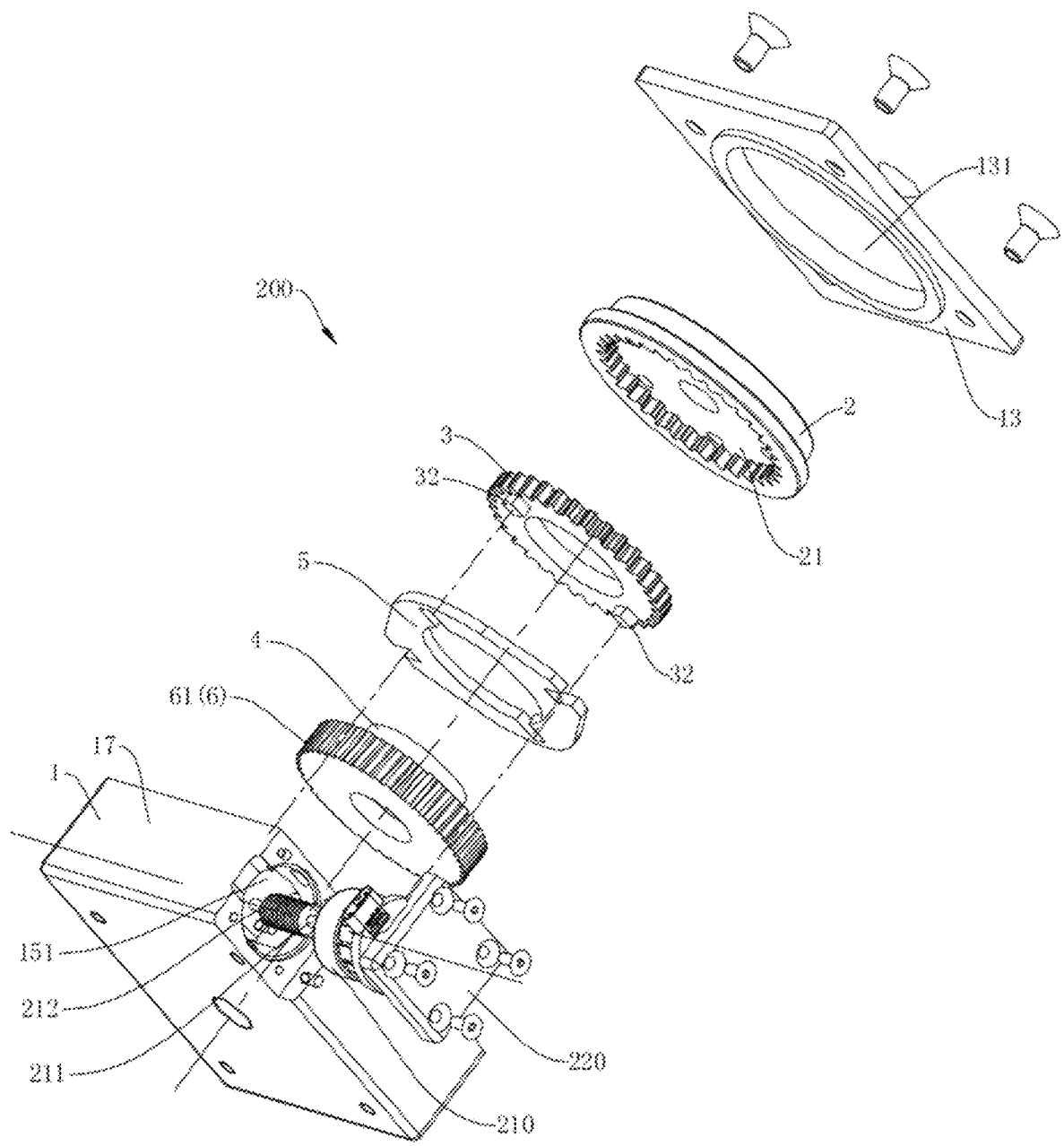
FIG. 6 is a perspective view of a joint assembly according to example embodiments of the present technology.
Figure 7:
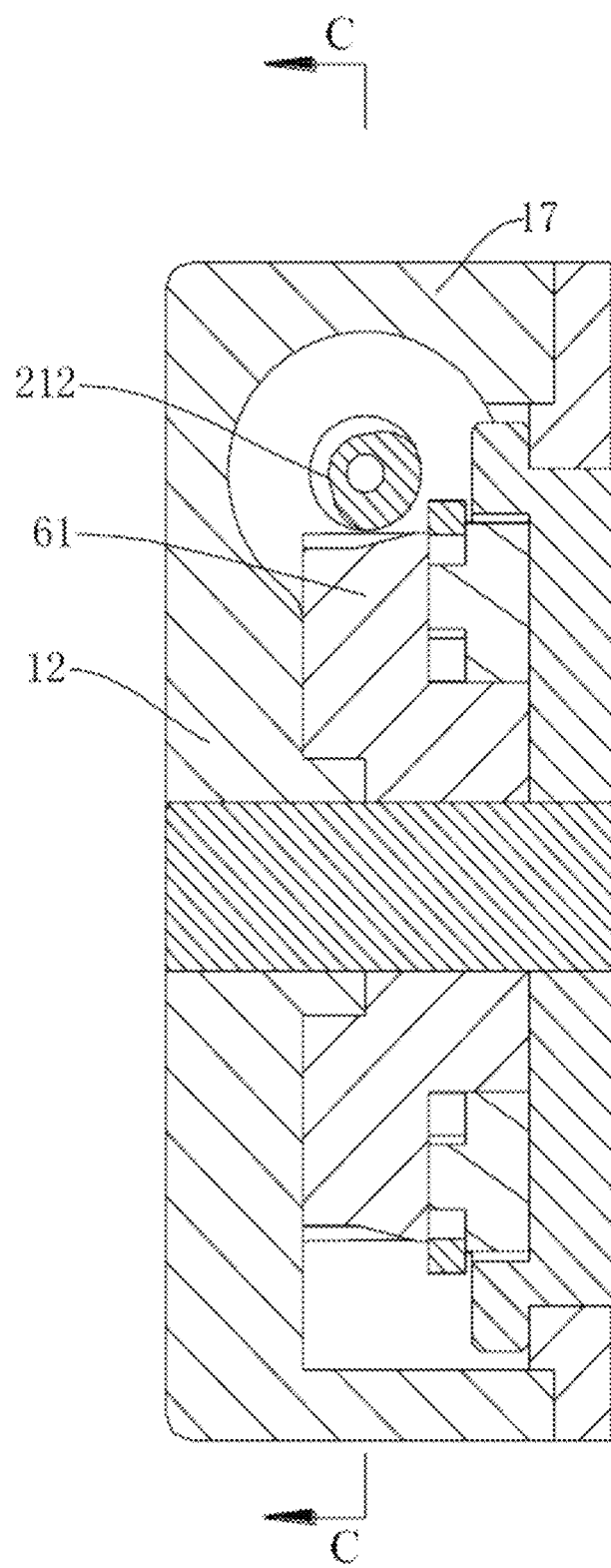
FIG. 7 is a sectional view of the joint assembly according to example embodiments of the present technology.
Figure 8:
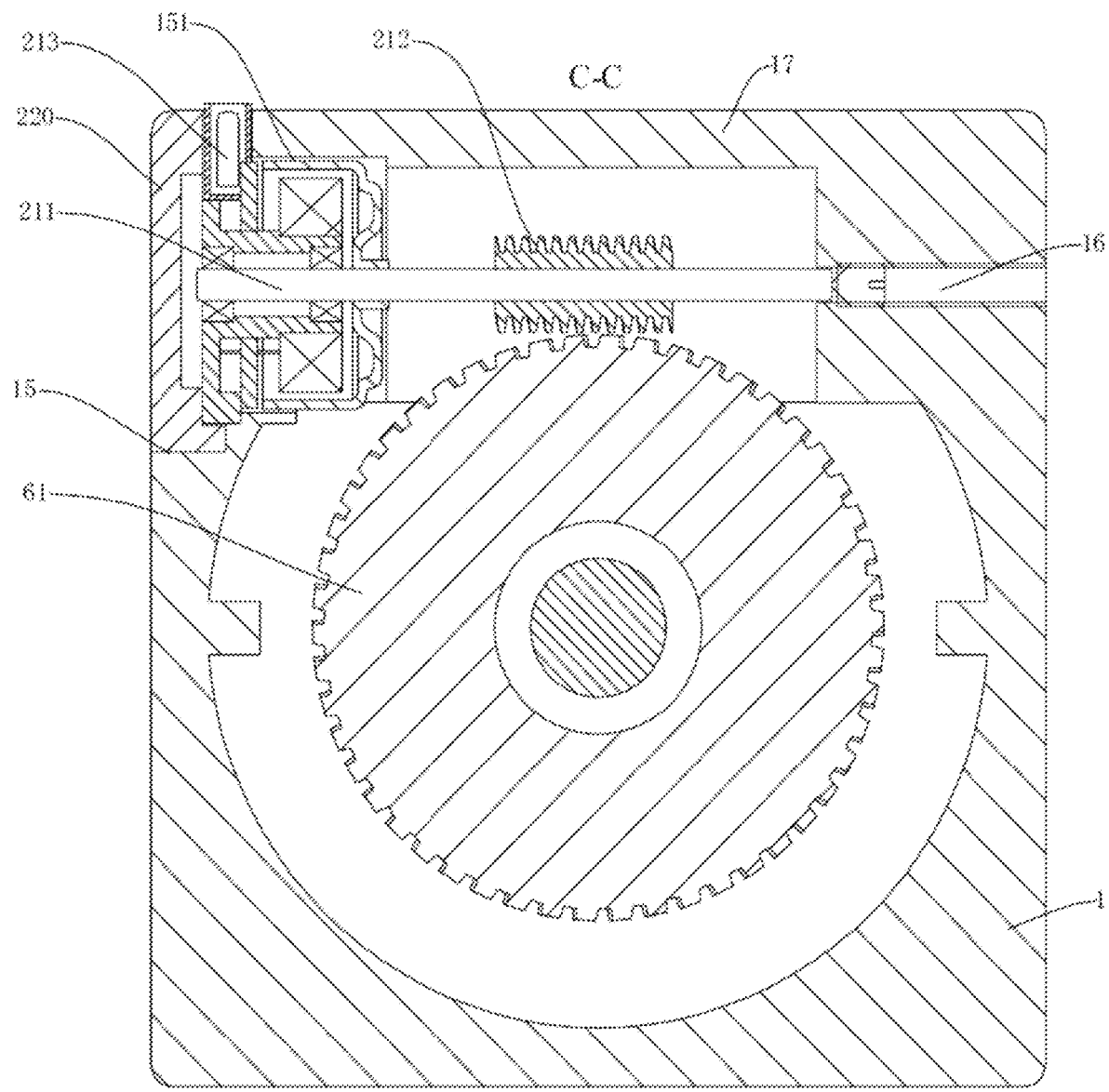
FIG. 8 is a sectional view of the joint assembly according to example embodiments of the present technology taken along line C-C in FIG. 7.

As shown in FIGS. 6 to 8, the joint assembly 200 according to some example embodiments of the present technology includes a speed reducer and a motor 210, and the speed reducer may be a speed reducer 100 according to any one of the above embodiments. The motor 210 includes a motor shaft 211 configured to drive the drive member 6 of the speed reducer 100 to rotate.

The joint assembly according to some example embodiments of the present technology has the advantages such as small size, simple structure, and large output torque, and it is especially suitable for equipment or devices with small installation space.

In some embodiments, as shown in FIGS. 6 to 8, the drive member 6 of the speed reducer 100 is the first gear 61, the first gear 61 is connected to the eccentric wheel 4, and the rotation axis of the first gear 61 is coaxial with the rotation axis of the eccentric wheel 4. The motor shaft 211 of the motor 210 includes the second gear 212, and the second gear 212 meshes with the first gear 61 to drive the first gear 61 to rotate. The number of teeth of the first gear 61 is greater than the number of teeth of the second gear 212, so that the rotation speed of the first gear 61 is less than the rotation speed of the second gear 212.

Since the rotation speed of the first gear 61 may be regarded as the input rotation speed of the speed reducer 100, the rotation speed of the internal gear 2 may be regarded as the output rotation speed of the speed reducer 100, and the rotation speed of the internal gear 2 is less than the rotation speed of the first gear 61, the number of teeth of the first gear 61 is greater than the number of teeth of the second gear 212, and the further deceleration may be carried out, so that the joint assembly 200 has a larger transmission ratio.

In some specific examples, as shown in FIG. 8, the second gear 212 is fitted over the motor shaft 211, and the motor shaft 211 is coaxial with the second gear 212, that is, a central axis of the motor shaft 211 coincides with the central axis of the second gear 212. The central axis of the second gear 212 is orthogonal to the central axis of the first gear 61. The motor 210 is arranged at a lateral side of the housing 1 and does not occupy an axial space of the joint assembly 200, which conduces to the reduction of the axial size of the joint assembly 200 and promotes the miniaturization of the joint assembly 200.

In some embodiments, the first gear 61 may be a helical gear, and the second gear 212 may be a spiral gear. The spiral gear and the helical gear have advantages such as simple processing, low manufacturing cost, and suitability for large-scale mold manufacturing.

As shown in FIGS. 6 to 8, a side surface of the housing 1 includes a mounting groove 15, the mounting groove 15 has a recess 151 in communication with an inner cavity of the housing 1, the first gear 61 is located in the inner cavity of the housing 1, and the motor 210 is arranged in the recess 151. The joint assembly 200 includes a motor cover 220, and the motor cover 220 is arranged in the mounting groove 15 and covers an opening of the recess 151. In this way, without occupying the axial space of the joint assembly 200, the recess 151 is inside the housing 1 is configured to accommodate the motor 210, the space utilization rate of the joint assembly 200 is further improved, the integrity of the joint assembly 200 is improved, and the integration and miniaturization of the joint assembly 200 are promoted.

In the example shown in FIG. 8, the mounting groove 15 is at an upper left corner of the housing 1. A side surface of the motor cover 220 is flush with the side surface of the housing 1, and the appearance of the joint assembly 200 is reasonable and beautiful. Also, there is a notch between the housing 1 and the motor cover 220, to allow a wiring terminal 213 of the motor 210 to extend out, to wire the motor 210.

As shown in FIG. 8, a wall surface of the inner cavity of the housing 1 includes a shaft hole 16 corresponding to the recess 151, one end of the motor shaft 211 (e.g., a left end in FIG. 8) is connected to a main body of the motor 210, and the other end of the motor shaft 211 is rotatably fitted in the shaft hole 16, so that the motor shaft 211 may rotate more stably, and the displacement of the motor shaft 211 is reduced or avoided. The second gear 212 is located between the recess 151 and the shaft hole 16.

It should be noted that the above example is only a structural form of the joint assembly 200, and the motor 210 and the speed reducer 100 may also have other layout forms. For example, the main body of the motor 210 is arranged outside the housing 1, the motor shaft 211 of the motor 210 extends into the housing 1 and is connected to the second gear 212; the central axis of the motor shaft 211, the central axis of the first gear 61 and the central axis of the second gear 212 are parallel to each other, that is, the motor 210 and the speed reducer 100 are arranged in the axial direction of the housing 1, and the motor shaft 211 of the motor 210 drives the first gear 61 to rotate through the second gear 212.

It should also be noted that the structure of the drive member 6 and the transmission means of the motor shaft 211, the drive member 6 and the eccentric wheel 4 are not limited to the above examples, for example, in some optional embodiments, the drive member 6 is a drive disc and includes a disc body and a disc hub located at a center of the disc body, the disc hub has a disc hub hole coaxial with the rotation axis of the eccentric wheel 4, and the motor shaft 211 is fitted in the disc hub hole to drive the drive disc to rotate. The disc body includes a toggle block, the eccentric wheel 4 includes a toggle groove, the toggle block is fitted in the toggle groove, and when the drive disc rotates clockwise or counterclockwise, the toggle block drives the eccentric wheel 4 to rotate.

The speed reducer according to some embodiments of the present technology includes: a housing; an internal gear rotatably and at least partially supported in the housing, the internal gear having an internal gear hole; an external gear at least partially arranged in the internal gear hole and meshing with the internal gear to drive the internal gear to rotate, the external gear having an external gear hole; an eccentric wheel rotatably and at least partially arranged in the external gear hole, a rotation axis of the eccentric wheel being coaxial with a central axis of the internal gear, and the eccentric wheel being configured to drive the external gear to revolve around the rotation axis of the eccentric wheel; a limiting disc arranged in the housing, the limiting disc being engaged with the housing so that the limiting disc and the housing are limited to relative movement in a first direction, and the limiting disc being engaged with the external gear so that the limiting disc and the external gear are limited to relative movement in a second direction, wherein the first direction, the second direction, and an axial direction of the limiting disc are orthogonal to each other; and a drive member connected to the eccentric wheel to drive the eccentric wheel to rotate.

The speed reducer according to some embodiments of the present technology includes: a housing; an internal gear rotatably and at least partially arranged in the housing, the internal gear having an internal gear hole, and a central axis of the internal gear hole being coaxial with a rotation axis of the internal gear; an external gear having an external gear hole, the external gear being at least partially arranged in the internal gear hole and meshing with the internal gear to drive the internal gear to rotate, and the external gear being translatable in a plane orthogonal to an axial direction of the external gear and being prevented from rotating around a central axis of the external gear; an eccentric wheel having an eccentric wheel hole, the eccentric wheel being rotatably and at least partially arranged in the external gear hole to drive the external gear to revolve around a central axis of the eccentric wheel hole, wherein a rotation axis of the eccentric wheel, the central axis of the eccentric wheel hole and the central axis of the internal gear are coaxial, and a central axis of an outer peripheral surface of the eccentric wheel is eccentric relative to the central axis of the eccentric wheel hole; and a drive member connected to the eccentric wheel to drive the eccentric wheel to rotate.

The speed reducer according to some embodiments of the present technology includes: a housing; an internal gear rotatably and at least partially supported in the housing, the internal gear having an internal gear hole; an external gear having an external gear hole, the external gear being at least partially arranged in the internal gear hole and meshing with the internal gear; an eccentric member rotatably arranged in the external gear hole to drive the external gear, wherein a rotation axis of the eccentric member is coaxial with a central axis of the internal gear, a central axis of an outer peripheral surface of the eccentric member is eccentric relative to the rotation axis of the eccentric member, and the external gear is revolvable around the rotation axis of the eccentric member and is prevented from rotating around a central axis of the external gear, to drive the internal gear to rotate; and a drive member connected to the eccentric wheel to drive the eccentric wheel to rotate.

The speed reducer according to the some embodiments of the present technology has advantages such as small size, simple structure and large transmission ratio, and can be applied to equipment or devices with small installation space.

An electric pendulum according to some embodiments of the present technology is described below.

As shown in FIGS. 9 to 12, the electric pendulum 300 includes a joint assembly and a swing arm 310. The joint assembly may be a joint assembly 200 according to any one of the above embodiments, and the swing arm 310 is connected to the internal gear 2 of the joint assembly 200 to be driven to swing by the internal gear 2.

The electric pendulum according to example embodiments of the present technology has the advantages such as small size, simple structure, and large transmission ratio.

Figure 12:
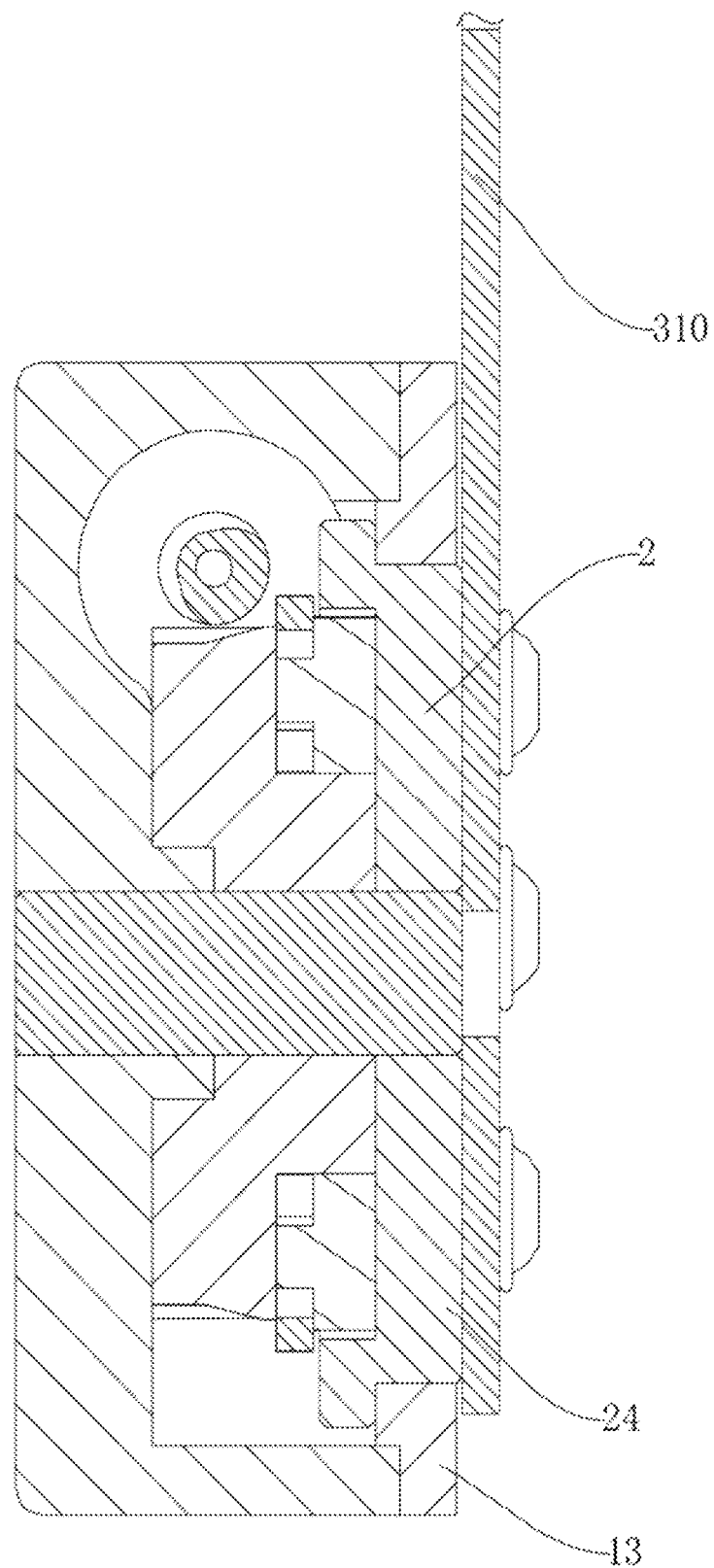
FIG. 12 is a sectional view of the electric pendulum according to example embodiments of the present technology.

In some specific examples, as shown in FIG. 12, the small diameter portion 24 of the internal gear 2 extends outward from the cover plate hole 131 of the cover plate 13, the swing arm 310 is connected to an end portion of the small diameter portion 24 (e.g., a right end in FIG. 12) by a plurality of connecting bolts, and the internal gear 2 rotates to drive the swing arm 310 to swing. There is a certain gap between the swing arm 310 and the cover plate 13, so as to prevent the cover plate 13 from affecting the swing of the swing arm 310.

The rotation speed of the motor 210 of the electric pendulum 300 according to some embodiments of the present technology is n1, and the torque of the motor 210 is T1. The transmission ratio (transmission speed ratio) of the electric pendulum 300 according to some embodiments of the present technology is i, and $i=\{z2 \times z3/[z1 \times (z4-z3)]\} \geq 2000$, in which $z1=1$, and $z4-z3 \geq 1$; z1 is the number of teeth of the second gear 212, z2 is the number of teeth of the first gear 61, z3 is the number of teeth of the external gear 3, and z4 is the number of teeth of the internal gear 2.

The swing speed of the swing arm 310 of the electric pendulum 310 according to some embodiments of the present technology is n2, and $n2=n1/i$; the torque of the swing arm 310 is T2, and $T2=T1 \times i \times \eta$, in which $\eta=0.6$-$0.8$. A swing range of the swing arm 310 is from 0° to 300°.

Figure 13:
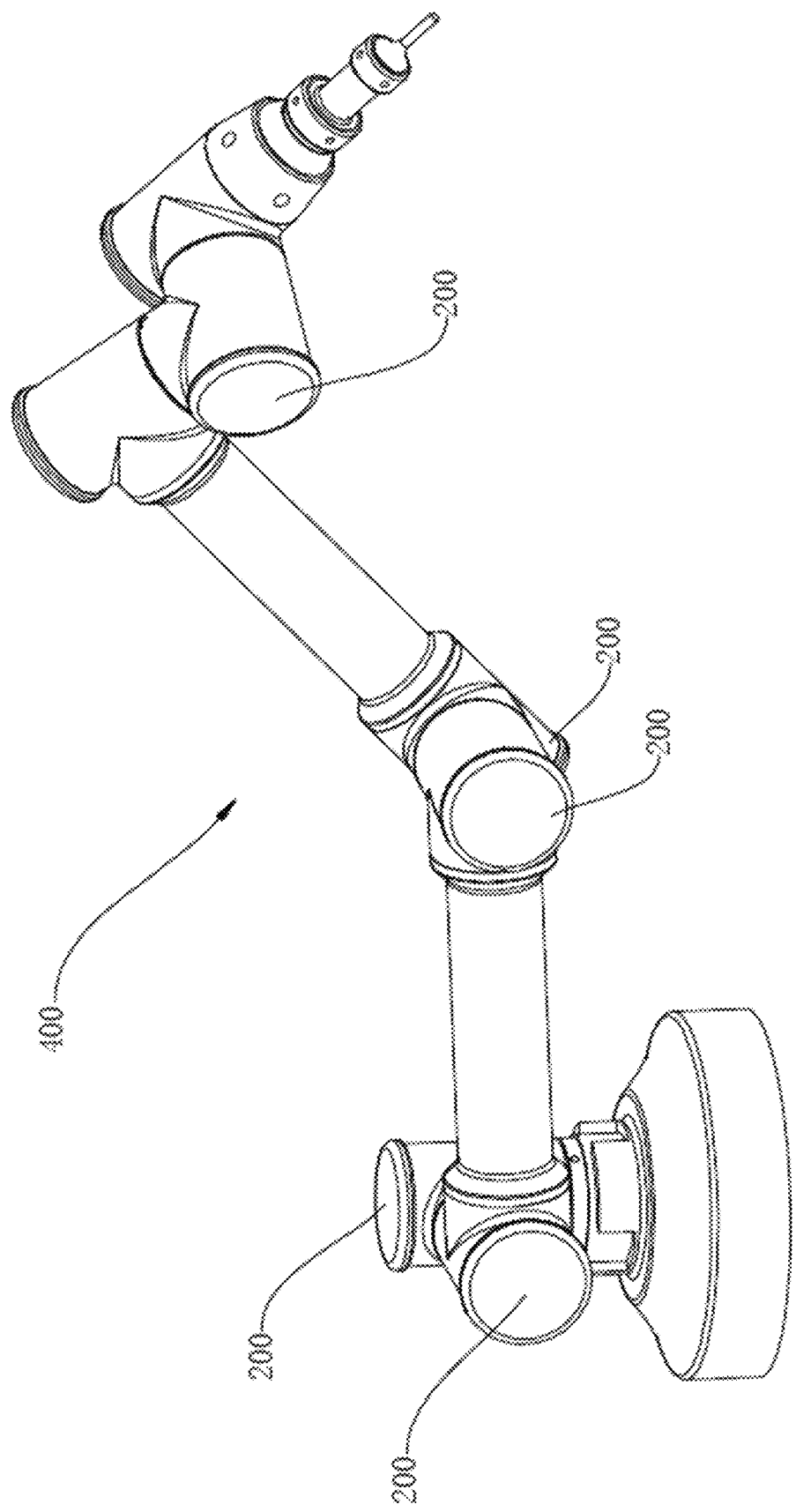
FIG. 13 is a schematic view of a robotic arm according to example embodiments of the present technology.

FIG. 13 shows a robotic arm 400 according to some embodiments of the present technology. The robotic arm 400 includes a plurality of joint assemblies 200, and the robotic arm 400 may perform various actions and operations through the drive of the joint assemblies 200.

Figure 14:
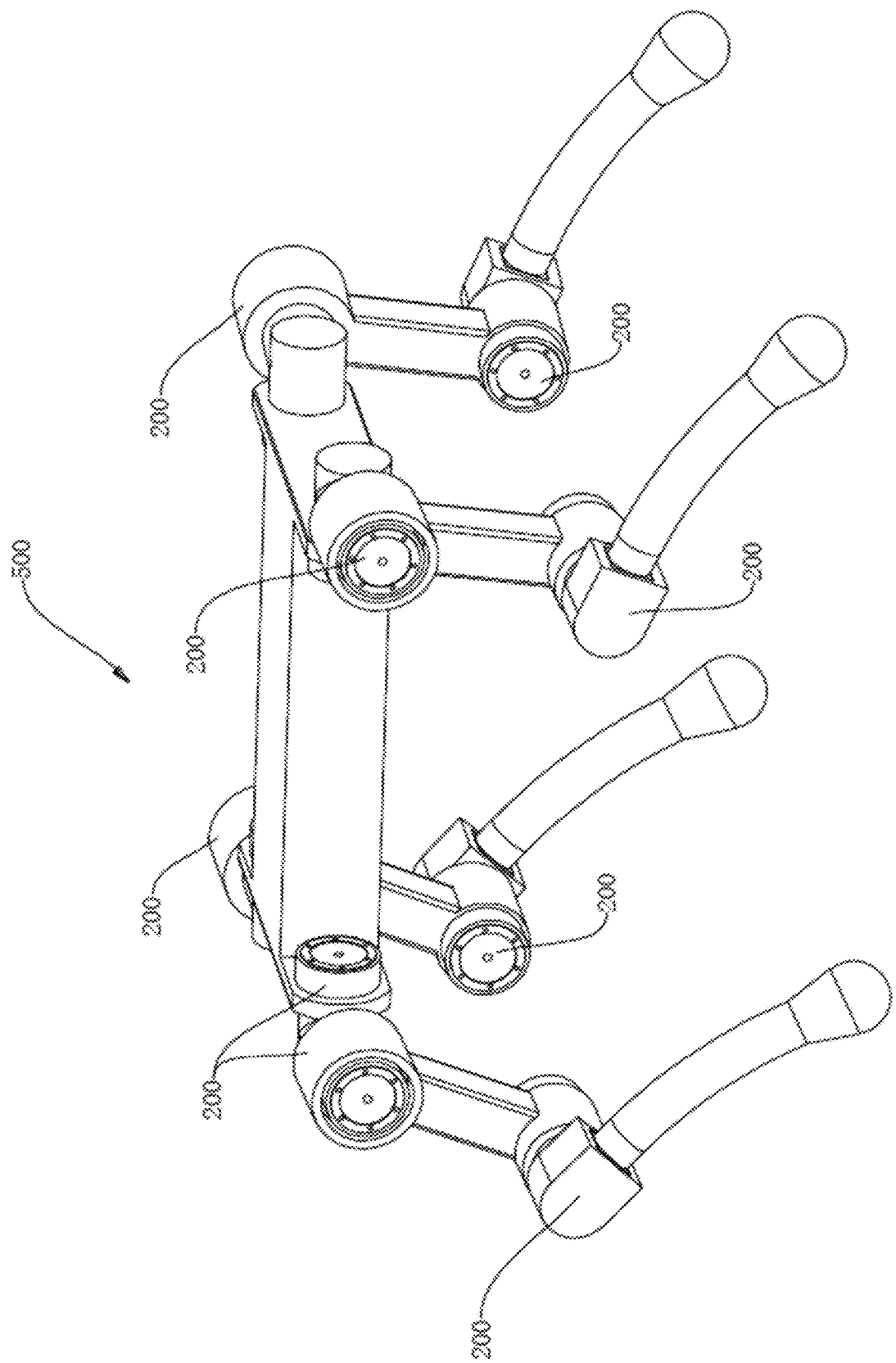
FIG. 14 is a schematic view of a robot according to example embodiments of the present technology.

FIG. 14 shows a robot 500 according to some embodiments of the present technology. The robot 500 includes the joint assembly 200, and the robot may achieve various actions through the drive of the joint assembly 200.

It should be understood that the robotic arm 400 and the robot 500, in accordance with some embodiments of the present technology, are not limited to the forms shown in the drawings.

A production system according to some embodiments of the present technology may include a robotic arm 400 and/or a robot 500 according to example embodiments of the present technology. For example, the production system may be an automobile production line or other product production line, in which the robotic arm 400 and/or the robot 500 may be configured to pick up parts of the automobile and/or assemble the automobile and its components.

Electric equipment according to some embodiments of the present technology may include the joint assembly 200 according to example embodiments of the present technology.

Figure 15:
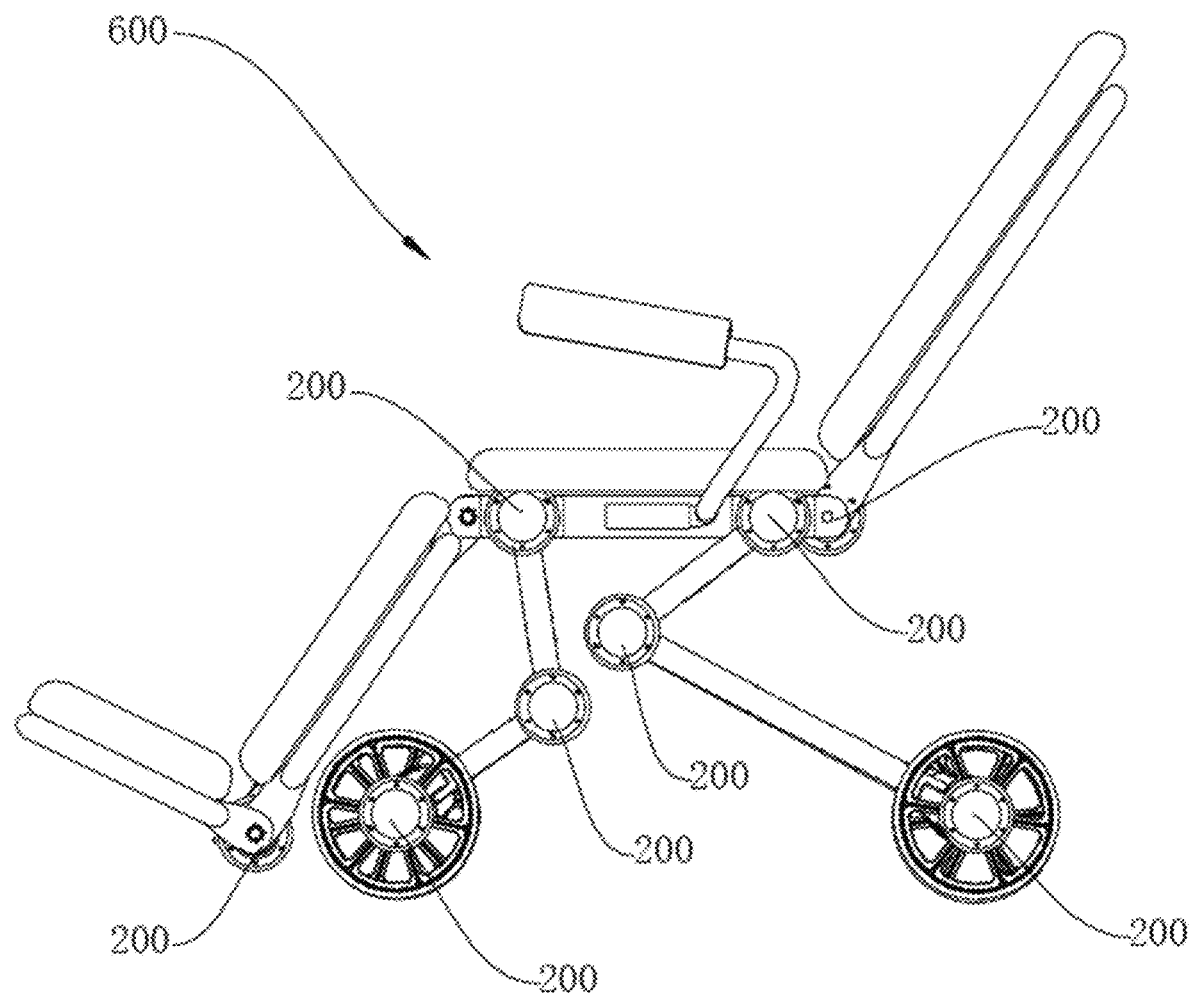
FIG. 15 is a schematic view of electric equipment according to example embodiments of the present technology.

In some embodiments, the electric equipment may be an electric wheelchair or an electric bed. For example, as shown in FIG. 15, the electric equipment according to some embodiments of the present technology is an electric wheelchair 600, and the electric wheelchair may walk and change its shape through the drive of the joint assembly 200.

It should be understood that the electric equipment according to some embodiment of the present technology is not limited to the electric bed and the electric wheelchair.

In some configurations, the electric pendulum includes: an outer casing, a first limiting portion being arranged in the outer casing; a rotation member and an eccentric shaft, the eccentric shaft being arranged at the rotation member, and an axis of the eccentric shaft being arranged parallel and eccentrically relative to an rotation axis of the rotation member; a motor configured to drive the rotation member and the eccentric shaft to rotate around the rotation axis of the rotation member; an internal gear rotatably arranged on the outer casing; an external gear fitted over the eccentric shaft and being rotatable relative to the eccentric shaft, the external gear including a second limiting portion, and the internal gear meshing with the external gear; a limiting disc located between the rotation member and the external gear, the limiting disc having a third limiting portion and a fourth limiting portion, the first limiting portion and the third limiting portion being movably engaged opposite to each other, and the second limiting portion and the fourth limiting portion being movably engaged opposite to each other, so as to translate the external gear along a first direction and a second direction orthogonal to the first direction; and a swing arm connected to the internal gear to be driven to swing by the internal gear.

In a further configuration, an axis of a motor shaft of the motor is orthogonal to the rotation axis of the rotation member; the rotation axis of the rotation member is orthogonal to a plane where the first direction and the second direction are located; and the rotation axis of the rotation member coincides with a rotation axis of the internal gear.

In a further configuration, the motor shaft includes a first gear; the first gear is detachably mounted on the motor shaft or is integrally formed with the motor shaft; the rotation member is a second gear meshing with the first gear; the first gear is a spiral gear; and the second gear is a helical gear.

In a further configuration, the first limiting portion is one of a limiting protrusion and a limiting groove, and the third limiting portion is the other one of the limiting protrusion and the limiting groove.

In a further configuration, the first limiting portion includes the first limiting protrusion and a second limiting protrusion arranged opposite to each other on an inner wall of the outer casing; the third limiting portion includes the first limiting groove and a second limiting groove arranged opposite to each other; the first limiting protrusion is relatively movably fitted in the first limiting groove; and the second limiting protrusion is relatively movably fitted in the second limiting groove.

In a further configuration, the second limiting portion is one of a limiting protrusion and a limiting groove, and the fourth limiting portion is the other one of the limiting protrusion and the limiting groove.

In a further configuration, the second limiting portion includes a third limiting protrusion and a fourth limiting protrusion arranged opposite to each other on the external gear; the fourth limiting portion includes the third limiting groove and a fourth limiting groove; the third limiting protrusion is movably fitted in the third limiting groove; and the fourth limiting protrusion is movably fitted in the fourth limiting groove.

In a further configuration, the limiting disc has a central hole; the first limiting groove and the second limiting groove are at an outer periphery of the limiting disc and are opened outwards; and the third limiting groove and the fourth limiting groove are at an inner periphery of the limiting disc and are opened inwards.

In a further configuration, a connecting line of the first limiting groove and the second limiting groove and a connecting line of the third limiting groove and the fourth limiting groove are orthogonal to each other.

In a further configuration, the first limiting groove and the second limiting groove are arranged opposite each other in the first direction; the third limiting groove and the fourth limiting groove are arranged opposite to each other in the second direction; and the third limiting protrusion and the fourth limiting protrusion are adjacent to an outer periphery of the external gear and are located inside teeth of the external gear.

In a further configuration, a wall of the outer casing defines an accommodation hole; the internal gear is rotatably arranged in the accommodation hole; the internal gear includes an internal toothed ring and a base plate configured to cover an end of the internal toothed ring; teeth of the internal gear are formed on an inner wall of the internal toothed ring; and the swing arm is fixed on the base plate.

In a further configuration, the outer casing includes a housing and a cover body; an inner cavity of the housing has an opening on a side towards the swing arm; the cover body is connected to the housing to cover the opening; and the accommodation hole is on the cover body.

In a further configuration, the base plate includes a first positioning hole; the swing arm includes a second positioning hole aligned with the first positioning hole; the outer casing includes an installation positioning shaft; the rotation member is rotatably mounted on the installation positioning shaft; and the installation positioning shaft is fitted in the first positioning hole and the second positioning hole through the eccentric shaft.

In a further configuration, the outer casing includes a recess, the motor is arranged in the recess, and the outer casing includes a motor cover covering the motor.

Some examples of the configurations are described according to FIGS. 1 to 12 below.

As shown in FIGS. 1 to 12, the electric pendulum 300 according to some embodiments of the present technology includes the outer casing 1 (also known as the housing), the rotation member (also known as the drive member) 6, the eccentric shaft (also known as the eccentric wheel) 4, the motor 210, the internal gear 2, the external gear 3, the limiting disc 5 and the swing arm 310.

The eccentric shaft 4 is arranged at the rotation member 6, and the axis of the eccentric shaft 4 is arranged parallel and eccentrically relative to the rotation axis of the rotation member 6. In other words, the axis of the eccentric shaft 4 and the rotation axis of the rotation member 6 are arranged at intervals in a radial direction of the rotation member 6. The motor 210 is configured to drive the rotation member 6 and the eccentric shaft 4 to rotate around the rotation axis of the rotation member 6.

The external gear 3 is fitted over the eccentric shaft 4, and the external gear 3 is rotatable relative to the eccentric shaft 4. That is to say, the external gear 3 rotates around the rotation axis of the rotation member 6, that is, the external gear 3 revolves around the rotation axis of the rotation member 6, but the external gear 3 does not rotate around a certain axis. That is, the external gear 3 does not rotate itself. The limiting disc 5 is located between the rotation member 6 and the external gear 3. The internal gear 2 is rotatably arranged on the outer casing 1, and the internal gear 2 meshes with the external gear 3. The swing arm is connected to the internal gear 2 to be driven to swing by the internal gear 2.

The outer casing 1 includes a first limiting portion 11 therein, and the external gear 3 includes a second limiting portion 32. The limiting disc 5 has a third limiting portion (e.g., the first limiting groove) 51 and a fourth limiting portion (e.g., the second limiting groove) 52. The first limiting portion 11 and the third limiting portion 51 are movably engaged opposite to each other, so that the external gear 3 may be translated in the first direction. The second limiting portion 32 and the fourth limiting portion 52 are movably engaged opposite to each other, so that the external gear 3 is translated in the second direction. This second direction is orthogonal to this first direction. The first direction is the direction where the X axis is located in FIG. 4, and the second direction is the direction where the Y axis is located in FIG. 4.

For example, in some implementations in accordance with the present technology, when the electric pendulum 300 works, the motor 210 drives the rotation member 6 to rotate, and then drives the eccentric shaft 4 to rotate through the rotation member 6. The external gear 3 is fitted over the eccentric shaft 4 and is rotatable relative to the eccentric shaft 4, therefore, the external gear 3 will not rotate around the rotation axis of the rotation member 6 under the drive of the eccentric shaft 4, that is, the external gear 3 will not rotate under the drive of the eccentric shaft 4.

By means of the cooperation between the first limiting portion 11 and the third limiting portion 51, and the cooperation between second limiting portion 32 and the fourth limiting portion 52, the external gear 3 moves along the first direction and the second direction orthogonal to each other. In other words, by means of the cooperation between the first limiting portion 11 and the third limiting portion 51, the limiting disc 5 can only move with respect to the outer casing 1 along one of the first direction and the second direction, and the external gear 3 can only move with respect to the limiting disc 5 along the other one of the first direction and the second direction. Further, the external gear 3 revolves around the rotation axis of the rotation member 6 in a first plane, and the first plane is parallel to each of the first direction and the second direction, that is, the external gear 3 moves in a circle with respect to the outer casing 1 around the rotation axis of the rotation member 6.

In the process of the revolution of the external gear 3, the external gear 3 meshes with the internal gear 2 so that the external gear 3 drives the internal gear 2 to rotate, that is, the external gear 3 drives the internal gear 2 to rotate itself, and then the internal gear 2 drives the swing arm 310 to swing.

In the electric pendulum 300, according to example embodiments of the present technology, by arranging the external gear 3 and the limiting disc 5 cooperating with each other, the external gear 3 undergoes revolution without rotation itself, so that the external gear 3 drives the internal gear 2 to rotate, and then the internal gear 2 drives the swing arm 310 to swing.

The internal gear 2 is driven to rotate by the external gear 3, so that the external gear 3 and the internal gear 2 cooperate to have the effect of deceleration, so that it is not necessary to arrange the speed reducer. In addition, since the external gear 3 may be embedded inside the internal gear 2, that is, the external gear 3 and the internal gear 2 may be approximately located in the same plane, so that the space occupied by the external gear 3 and the internal gear 2 may be effectively reduced, and the volume of the electric pendulum 300 may be effectively reduced. Moreover, the internal gear 2 is driven to rotate by the external gear 3, and a large transmission ratio may be obtained.

Therefore, the electric pendulum 300 according to example embodiments of the present technology has the advantages of small size, simple structure, large transmission ratio, small input, large output and so on, and can be applied to an occasion with small installation space.

In some embodiments, for example, the electric pendulum 300 includes the outer casing 1, the rotation member 6, the eccentric shaft 4, the motor 210, the internal gear 2, the external gear 3, the limiting disc 5 and the swing arm 310.

The outer casing includes the recess 151, and the motor 210 is arranged in the recess 151. The outer casing 1 includes the motor cover 220 covering the motor 210. Consequently, the structure of the electric pendulum 300 may be more reasonable.

The outer casing 1 includes the housing and the cover body (also known as the cover plate) 13, the inner cavity of the housing has the opening on the side towards the swing arm 310, and the cover body 13 is connected to the housing to cover the opening.

In some embodiments, the outer casing 1 has a rectangular shape or a square shape. The housing may include an end wall 12 and a side plate 17, the end wall 12 is arranged opposite to the opening, the side plate 17 is arranged at the end wall 12, the side plate 17 includes the recess 151, and the motor cover 220 is arranged on the side plate 17 so as to cover the recess 151.

The wall of the outer casing 1 defines the accommodation hole (also known as the cover plate hole) 131, and the internal gear 2 is rotatably arranged in the accommodation hole 131. Consequently, the space occupied by the internal gear 2 may be further reduced, and the volume of the electric pendulum 300 may be further effectively reduced, so that the electric pendulum 300 is better suitable for the occasion with small installation space.

In some embodiments, the accommodation hole 131 is at the cover body 13, and the accommodation hole 131 penetrates the cover body 13 along a thickness direction of the cover body 13. Consequently, the structure of the electric pendulum 300 may be more reasonable.

Figure 9:
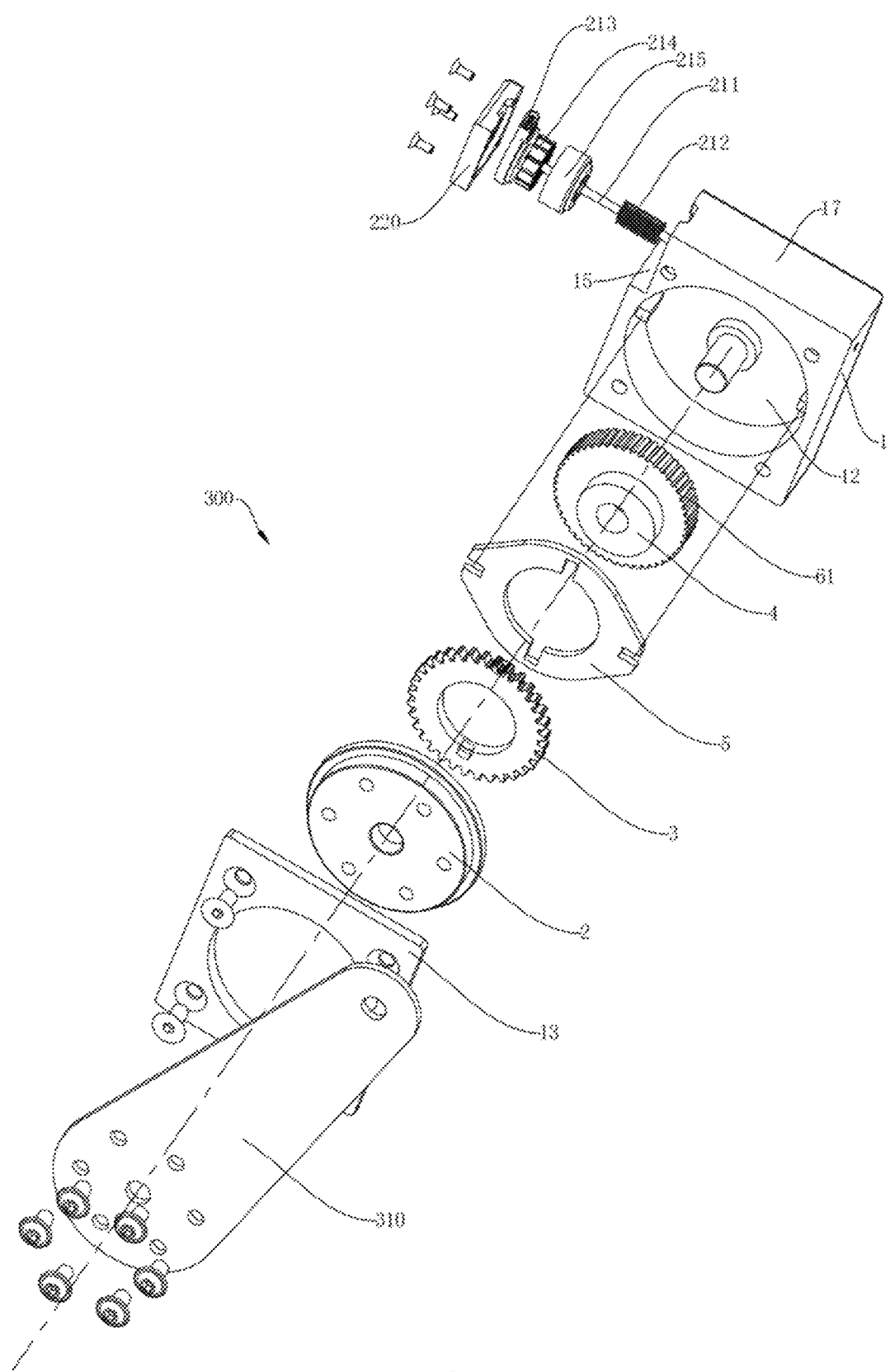
FIG. 9 is a perspective view of an electric pendulum according to example embodiments of the present technology.
Figure 10:
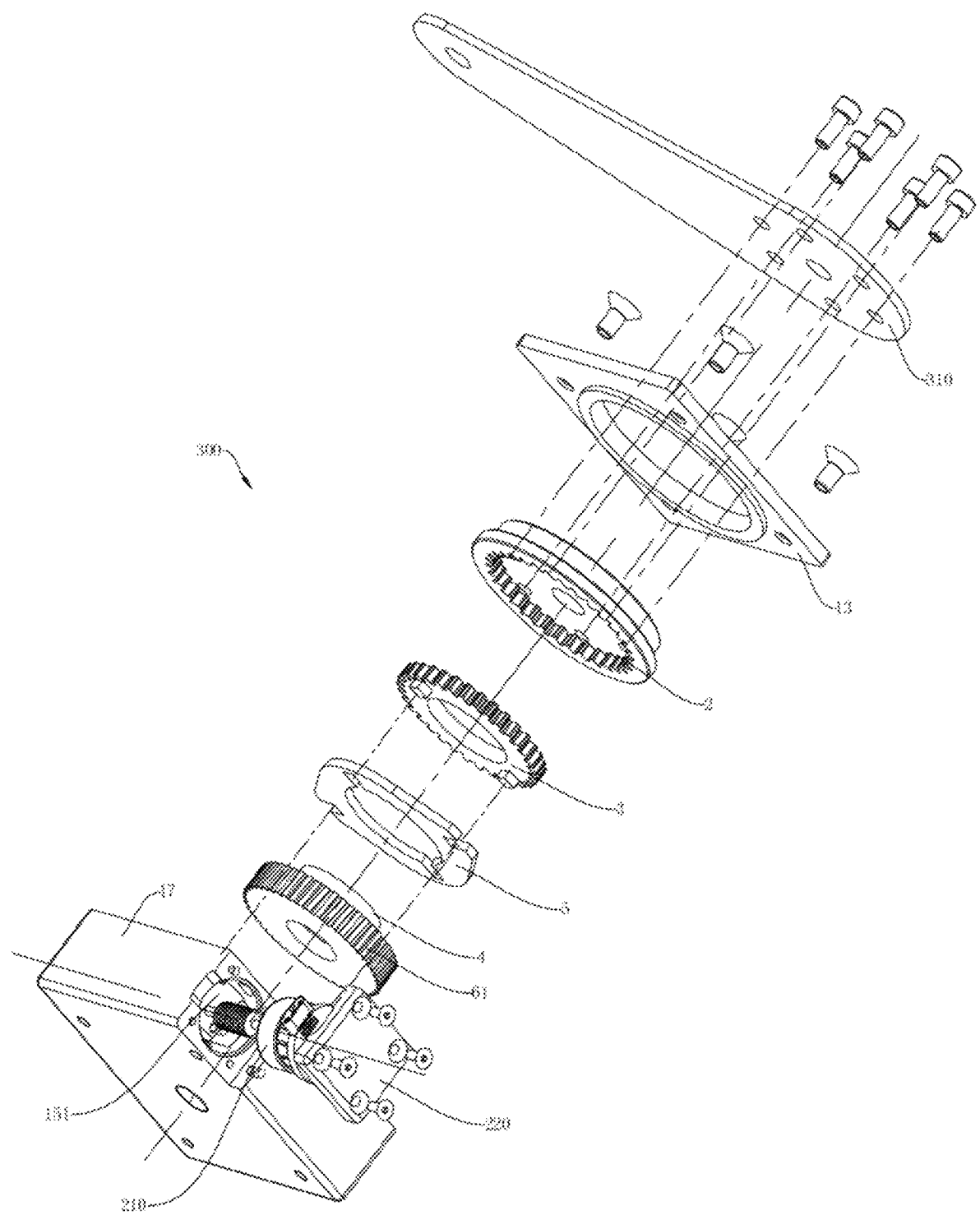
FIG. 10 is another perspective view of the electric pendulum according to example embodiments of the present technology.
Figure 11:
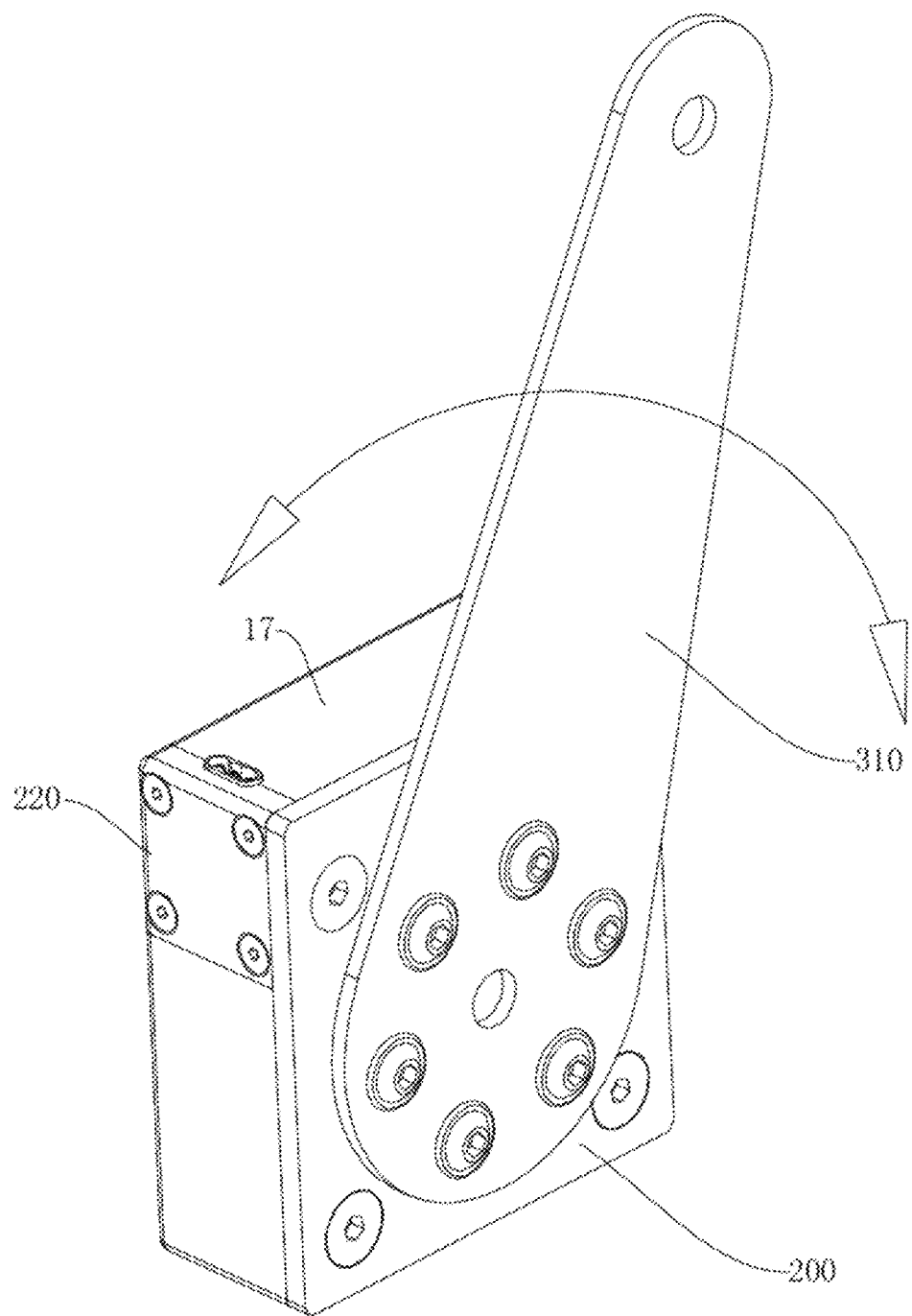
FIG. 11 is another perspective view of the electric pendulum according to example embodiments of the present technology.

As shown in FIGS. 8 and 9, the motor 210 is located in the outer casing 1, for example, the motor 210 is located in the inner cavity. The motor 210 may include a stator 214, a rotor 215, a wiring terminal 213 and a motor shaft 211, and the motor shaft 211 is connected to the rotor 215.

The motor shaft 211 includes a second gear 212, the second gear 212 is detachably mounted on the motor shaft 211, or the second gear 212 is integrally formed with the motor shaft 211. The rotation member 6 is a first gear 61, and the first gear 61 meshes with the second gear 212. For example, the second gear 212 is a spiral gear, and the first gear 61 is a helical gear. The spiral gear and the helical gear have advantages such as simple processing, low manufacturing cost, and suitability for large-scale mold manufacturing.

In some embodiments, the axis of the motor shaft 211 of the motor 210 is orthogonal to the rotation axis of the rotation member 6. Consequently, the structure of the electric pendulum 300 may be more reasonable.

As shown in FIG. 3, the electric pendulum 300 further includes the installation positioning shaft (also known as the positioning shaft) 7, the installation positioning shaft 7 is arranged in the outer casing 1, and the rotation member 6 is rotatably mounted on the installation positioning shaft 7, so that the rotation member 6 may be mounted more firmly and more easily.

The end wall 12 defines an assembly hole penetrating the end wall 12 in a thickness direction of the end wall 12, that is, the assembly hole penetrates the end wall 12 along the thickness direction of the end wall 12. A part of the installation positioning shaft 7 is fitted in the assembly hole, and another part of the installation positioning shaft 7 is located in the inner cavity.

The eccentric shaft 4 is located in the inner cavity, and the eccentric shaft 4 is arranged at the rotation member 6. In some embodiments, the eccentric shaft 4 is rotatably fitted over the installation positioning shaft 7, so as to make the structure of the electric fork rod 300 more reasonable. The axis of the eccentric shaft 4 is arranged parallel and eccentrically relative to the rotation axis of the rotation member 6. In other words, the axis of the eccentric shaft 4 and the rotation axis of the rotation member 6 are arranged at intervals in a radial direction of the rotation member 6. Consequently, the eccentric shaft 4 rotates around the rotation axis of the rotation member 6 under the drive of the rotation member 6.

The external gear 3 is located in the inner cavity, is fitted over the eccentric shaft 4, and is rotatable relative to the eccentric shaft 4. That is to say, the external gear 3 rotates around the rotation axis of the rotation member 6, that is, the external gear 3 revolves around the rotation axis of the rotation member 6, but the external gear 3 does not rotate around the rotation axis of the rotation member 6, that is, the external gear 3 does not rotate itself.

The limiting disc 5 is located in the inner cavity. The eccentric shaft 4 may pass through the limiting disc 5, and the eccentric shaft 4 may rotate relative to the limiting disc 5. In other words, the limiting disc 5 does not rotate with the eccentric shaft 4. The inner periphery of the limiting disc 5 is located outside the eccentric shaft 4, and the inner periphery of the limiting disc 5 is spaced apart from the eccentric shaft 4.

The limiting disc 5 is located between the rotation member 6 and the external gear 3 in an extension direction of the rotation axis of the rotation member 6. Consequently, it may make the external gear 3 more convenient to cooperate with the internal gear 2.

In some embodiments, the first limiting portion 11 is one of the limiting protrusion and the limiting groove, and the third limiting portion 51 is the other one of the limiting protrusion and the limiting groove. The second limiting portion 32 is one of the limiting protrusion and the limiting groove, and the forth limiting portion 52 is the other one of the limiting protrusion and the limiting groove.

As shown in FIG. 4, the first limiting portion 11 includes the first limiting protrusion and the second limiting protrusion arranged opposite to each other on the inner wall of the outer casing 1. In some embodiments, the first limiting protrusion and the second limiting protrusion are arranged on the wall surface of the inner cavity.

As shown in FIG. 4, the third limiting portion 51 includes the first limiting groove and the second limiting groove arranged opposite to each other, the first limiting protrusion is relatively movably fitted in the first limiting groove, and the second limiting protrusion is relatively movably fitted in the second limiting groove. Specifically, the first limiting protrusion is relatively movably fitted in the first limiting groove along the first direction (such as the left-right direction in FIG. 4), and the second limiting protrusion is relatively movably fitted in the second limiting groove along the first direction. That is to say, the first limiting protrusion and the second limiting protrusion are fixed, and the first limiting groove and the second limiting groove move along the first direction. Consequently, it may make the limiting disc 5 and the external gear 3 translate along the first direction.

As shown in FIG. 4, the second limiting portion 32 includes the third limiting protrusion and the fourth limiting protrusion arranged opposite to each other on the external gear 3. In some embodiments, the first limiting protrusion and the second limiting protrusion are arranged on an end face of the external gear 3 towards the rotation member 6. The third limiting protrusion, the fourth limiting protrusion and the external gear 3 may be integrally formed.

As shown in FIG. 4, the fourth limiting portion 52 includes the third limiting groove and the fourth limiting groove, the third limiting protrusion is movably fitted in the third limiting groove, and the fourth limiting protrusion is movably fitted in the fourth limiting groove. Specifically, the third limiting protrusion is movably fitted in the third limiting groove along the second direction (such as the up-down direction in FIG. 4), and the fourth limiting protrusion is movably fitted in the fourth limiting groove along the second direction. That is to say, the third limiting protrusion and the fourth limiting protrusion do not move along the second direction, and the third limiting protrusion and the fourth limiting groove move along the second direction. Consequently, it may make the external gear 3 translate along the second direction.

Further, the external gear 3 revolves around the rotation axis of the rotation member 6 in a first plane, and the first plane is parallel to each of the first direction and the second direction. In other words, the first plane is a plane where the first direction and the second direction are located. In some embodiments, the rotation axis of the rotation member 6 is orthogonal to the plane where the first direction and the second direction are located, that is, the rotation axis of the rotation member 6 is orthogonal to the first plane. Consequently, the structure of the electric pendulum 300 may be more reasonable.

As shown in FIG. 4, a connecting line of the first limiting groove and the second limiting groove and a connecting line of the third limiting groove and the fourth limiting groove are orthogonal to each other. Consequently, the structure of the electric pendulum 300 may be more reasonable.

In some embodiments, as shown in FIG. 4, the first limiting protrusion and the second limiting protrusion are arranged opposite to each other in a first radial direction of the rotation member 6, that is, the first limiting protrusion and the second limiting protrusion are arranged opposite to each other in a first radial direction of the external gear 3. The first limiting groove and the second limiting groove are arranged opposite to each other in the first radial direction of the rotation member 6, that is, the first limiting groove and the second limiting groove are arranged opposite to each other in the first radial direction of the external gear 3. The first limiting protrusion and the second limiting protrusion are arranged opposite to each other in the first direction, and the first limiting groove and the second limiting groove are arranged opposite to each other in the first direction. Consequently, the structure of the electric pendulum 300 may be more reasonable.

In some embodiments, as shown in FIG. 4, the third limiting protrusion and the fourth limiting protrusion are arranged opposite to each other in a second radial direction of the rotation member 6, that is, the third limiting protrusion and the fourth limiting protrusion are arranged opposite to each other in a second radial direction of the external gear 3. The third limiting groove and the fourth limiting groove are arranged opposite to each other in the second radial direction of the rotation member 6, that is, the third limiting groove and the fourth limiting groove are arranged opposite to each other in the second radial direction of the external gear 3. The third limiting protrusion and the fourth limiting protrusion are arranged opposite to each other in second first direction, and the third limiting groove and the fourth limiting groove are arranged opposite to each other in the second direction. Consequently, the structure of the electric pendulum 300 may be more reasonable.

The limiting disc 5 has a central hole, the first limiting groove and the second limiting groove (i.e., the third limiting portion 51) are at the outer periphery of the limiting disc 5 and are opened outwards, and the third limiting groove and the fourth limiting groove (i.e., the fourth limiting portion 52) are at the inner periphery of the limiting disc 5 and are opened inwards. The third limiting protrusion and the fourth limiting protrusion (i.e., the second limiting portion 32) are adjacent to the outer periphery of the external gear and are located inside the teeth of the external gear.

In some embodiments, a size of the limiting disc 5 in the first direction is greater than a size of the limiting disc 5 in the second direction. Consequently, the limiting disc 5 may be more easily assembled with the outer casing 1 and the external gear 3, thereby the electric pendulum 300 may be assembled more easily. For example, the limiting disc 5 may have roughly an oval shape.

The internal gear 2 is rotatably arranged on the outer casing 1, and the internal gear 2 meshes with the external gear 3. In some embodiments, the rotation axis of the rotation member 6 coincides with the rotation axis of the internal gear 2. Consequently, the structure of the electric pendulum 300 may be more reasonable.

As shown in FIGS. 3 and 12, the internal gear 2 includes the internal toothed ring (also known as the large diameter portion, and the internal gear hole being arranged in the large diameter portion) 23 and the base plate (also known as the small diameter portion) 24 configured to cover an end of the internal toothed ring 23, the tooth of the internal gear 2 is formed on the inner wall of the internal toothed ring 23, and the swing arm 310 is fixed on the base plate 24. Consequently, the structure of the internal gear 2 may be more reasonable. The internal gear ring 23 and the base plate 24 may be integrally formed, so as to improve the structural strength of the internal gear 2.

As shown in FIG. 3, the base plate 24 includes the first positioning hole (also known as the positioning hole) 22, and the installation positioning shaft 7 passes through the eccentric shaft 4 and is fitted in the first positioning hole 22, thereby the assembly accuracy of the electric pendulum 300 may be improved. In some embodiments, the swing arm 310 may define the second positioning hole aligned with the first positioning hole 22, and the installation positioning shaft 7 may fit in the first positioning hole 22 and the second positioning hole after passing through the eccentric shaft 4, so as to improve the assembly accuracy of the electric pendulum 300.

The rotation speed of the motor 210 of the electric pendulum 300 according to some embodiments of the present technology is n1, and the torque of the motor 210 is T1. The transmission ratio (transmission speed ratio) of the electric pendulum 300 according to some embodiments of the present technology is i, and $i=\{z2 \times z3/[z1 \times (z4-z3)]\} \geq 2000$, in which $z1=1$, and $z4-z3 \geq 1$; $z1$ is the number of teeth of the second gear 212, $z2$ is the number of teeth of the first gear 61, $z3$ is the number of teeth of the external gear 3, and $z4$ is the number of teeth of the internal gear 2.

The swing speed of the swing arm 310 of the electric pendulum 300 according to some embodiments of the present technology is n2, and $n2=n1/i$; the torque of the swing arm 310 is T2, and $T2=T1 \times i \times \eta$, in which $\eta=0.6$-$0.8$. A swing range of the swing arm 310 is from 0° to 300°.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation or be constructed and operated in a particular orientation. There terms shall not be construed as limitation on the present technology.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the term "a plurality of" means at least two, e.g., two or three, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be mutual communication; may also be direct connections or indirect connections via intervening structures; may also be inner connection or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present technology. Thus, the appearances of the phrases in various places throughout this specification are not necessarily referring to the same embodiment or example of the present technology.

Furthermore, the particular features, structures, materials, or characteristics may be combined in any suitable manner in one or more embodiments or examples. Moreover, different embodiments or examples as well as features in different embodiments or examples described in this specification may be combined and united by those skilled in the art in case of no mutual contradiction.

Although some embodiments have been shown and described, it would be appreciated by those skilled in the art that the above embodiments are exemplary and cannot be construed to limit the present technology, and changes, modifications, alternatives and variations can be made in the embodiments without departing from the scope of the present disclosure.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A speed reducer, comprising:
    a housing;
    an internal gear rotatably and at least partially supported in the housing, the internal gear having a concentric internal gear hole having a peripheral surface with internal teeth arranged thereon and an internal gear through-hole;
    an external gear at least partially arranged in the concentric internal gear hole and having external teeth meshing with the internal teeth of the concentric internal gear hole to drive the internal gear to rotate, the external gear having an external gear through-hole;
    an eccentric wheel rotatably and at least partially arranged in the external gear through-hole, the eccentric wheel having an eccentric wheel hole extending through the eccentric wheel, wherein a rotation axis of the eccentric wheel is coaxial with a central axis of the internal gear, and the eccentric wheel is configured to drive the
external gear to revolve around the rotation axis of the
eccentric wheel;
a limiting disc arranged in the housing, the limiting disc
being engaged with the housing so that the limiting disc
and the housing are limited to relative movement in a
first direction, and the limiting disc being engaged with
the external gear so that the limiting disc and the
external gear are limited to relative movement in a
second direction, wherein the first direction, the second
direction, and an axial direction of the limiting disc are
orthogonal to each other;
a drive member connected to the eccentric wheel to drive
the eccentric wheel to rotate, the drive member having
a hole therethrough; and
a positioning shaft connected to a wall of the housing and
extending from the wall through the hole of the drive
member, the eccentric wheel hole of the eccentric
wheel, the external gear through-hole of the external
gear, and the internal gear through-hole of the internal
gear.

2. The speed reducer according to claim 1, wherein:
one of the limiting disc and the housing comprises a first
limiting portion, and the other one of the limiting disc
and the housing comprises a first limiting groove, the
first limiting portion being fitted in the first limiting
groove and being movable in the first direction; and
one of the limiting disc and the external gear comprises a
second limiting portion, and the other one of the
limiting disc and the external gear comprises a second
limiting groove, the second limiting portion being fitted
in the second limiting groove and being movable in the
second direction.

3. The speed reducer according to claim 2, wherein:
the first limiting portion is on the housing, the second
limiting portion is on the external gear, and the first
limiting groove and the second limiting groove are on
the limiting disc; and
two first limiting portions, two second limiting portions,
two first limiting grooves, and two second limiting
grooves are provided, wherein the two first limiting
portions are opposite in the first direction and the two
first limiting grooves are opposite in the first direction,
and the two second limiting portions are opposite in the
second direction and the two second limiting grooves
are opposite in the second direction,
wherein the limiting disc has roughly an oval shape.

4. The speed reducer according to claim 2, wherein the
first limiting portion and the second limiting portion are
prisms or cylindrical rods, and the first limiting groove and
the second limiting groove are U-shaped grooves.

5. The speed reducer according to claim 1, wherein the
drive member is a first gear, the first gear is rotatably
supported in the housing and is connected to the eccentric
wheel, and a rotation axis of the first gear is coaxial with the
rotation axis of the eccentric wheel.

6. The speed reducer according to claim 5,
wherein the housing has a first end and a second end, and
the positioning shaft is connected to an end wall of the
first end of the housing and extends towards the second
end of the housing;
wherein the eccentric wheel hole of the eccentric wheel,
the hole of the drive member, and the internal gear
through-hole of the internal gear are all coaxial with the
internal gear.

7. The speed reducer according to claim 5, wherein the
housing has a first end and a second end; an end wall of the
first end of the housing comprises a central flange extending
towards the second end of the housing; the first gear has a
positioning groove coaxial with the rotation axis of the
eccentric wheel; and the central flange is rotatably fitted in
the positioning groove.

8. The speed reducer according to claim 1, wherein the
housing has a first end and a second end; the second end of
the housing is open and is covered by a cover plate; the cover
plate has a cover plate hole; a part of the internal gear is
located in the housing, and another part of the internal gear
is rotatably supported in the cover plate hole.

9. The speed reducer according to claim 8, wherein an
outer peripheral surface of the internal gear is a stepped
surface to divide the internal gear into a large diameter
portion and a small diameter portion; the large diameter
portion is located in the housing; and the small diameter
portion is rotatably fitted in the cover plate hole.

10. A joint assembly, comprising:
a speed reducer, comprising
a housing,
an internal gear rotatably and at least partially supported in the housing, the internal gear having a
concentric internal gear hole having a peripheral
surface with internal teeth arranged thereon and an
internal gear through-hole,
an external gear at least partially arranged in the
concentric internal gear hole and having external
teeth meshing with the internal teeth of the concentric internal gear hole to drive the internal gear to
rotate, the external gear having an external gear
through-hole,
an eccentric wheel rotatably and at least partially
arranged in the external gear through-hole, the
eccentric wheel having an eccentric wheel hole
extending through the eccentric wheel, wherein a
rotation axis of the eccentric wheel is coaxial with a
central axis of the internal gear, and the eccentric
wheel is configured to drive the external gear to
revolve around the rotation axis of the eccentric
wheel,
a limiting disc arranged in the housing, the limiting disc
being engaged with the housing so that the limiting
disc and the housing are limited to relative movement in a first direction, and the limiting disc being
engaged with the external gear so that the limiting
disc and the external gear are limited to relative
movement in a second direction, wherein the first
direction, the second direction, and an axial direction
of the limiting disc are orthogonal to each other,
a drive member connected to the eccentric wheel to
drive the eccentric wheel to rotate, the drive member
having a hole therethrough, and
a positioning shaft connected to a wall of the housing
and extending from the wall through the hole of the
drive member, the eccentric wheel hole of the eccentric wheel, the external gear through-hole of the
external gear, and the internal gear through-hole of
the internal gear; and
a motor configured to drive the drive member to rotate.

11. The joint assembly according to claim 10, wherein:
the drive member of the speed reducer is a first gear
connected to the eccentric wheel, and a rotation axis of
the first gear is coaxial with the rotation axis of the
eccentric wheel; and
a motor shaft of the motor comprises a second gear, the
second gear meshes with the first gear to drive the first gear to rotate, and the number of teeth of the first gear is greater than the number of teeth of the second gear.

12. The joint assembly according to claim 11, wherein a central axis of the motor shaft coincides with a central axis of the second gear, the central axis of the second gear is orthogonal to a central axis of the first gear, and the motor is arranged at a lateral side of the housing.

13. The joint assembly according to claim 12, wherein:
a side surface of the housing comprises a mounting groove, the mounting groove has a recess in communication with an inner cavity of the housing, and the motor is arranged in the recess; and
the joint assembly comprises a motor cover arranged in the mounting groove and covering an opening of the recess.

14. The joint assembly according to claim 13, wherein a wall surface of the inner cavity of the housing comprises a shaft hole corresponding to the recess; a first end of the motor shaft is connected to a main body of the motor and a second end of the motor shaft is rotatably fitted in the shaft hole; and the second gear is located between the recess and the shaft hole.

15. The joint assembly according to claim 11, wherein a main body of the motor is arranged outside the housing; wherein the motor shaft of the motor extends into the housing; and wherein a central axis of the motor shaft and a central axis of the second gear are parallel to each other and are perpendicular to a central axis of the first gear.

16. The joint assembly according to claim 10, wherein:
the eccentric wheel comprises a toggle groove;
the drive member is a drive disc that comprises (i) a disc body and (ii) a disc hub at a center of the disc body, the disc hub has a disc hub hole coaxial with the rotation axis of the eccentric wheel, and the disc body comprises a toggle block fitted in the toggle groove of the eccentric wheel to drive the eccentric wheel to rotate during clockwise rotation or counterclockwise rotation of the drive disc,
wherein the motor shaft is fitted in the disc hub hole to drive the drive disc to rotate.

17. An electric pendulum, comprising:
a joint assembly comprising a speed reducer and a motor; and
a swing arm,
wherein the speed reducer comprises:
a housing,
an internal gear rotatably and at least partially supported in the housing, the internal gear having a concentric internal gear hole having a peripheral surface with internal teeth arranged thereon and an internal gear through-hole,
an external gear at least partially arranged in the concentric internal gear hole and having external teeth meshing with the internal teeth of the concentric internal gear hole to drive the internal gear to rotate, the external gear having an external gear through-hole,
an eccentric wheel rotatably and at least partially arranged in the external gear through-hole, the eccentric wheel having an eccentric wheel hole extending through the eccentric wheel, wherein a rotation axis of the eccentric wheel is coaxial with a central axis of the internal gear, and the eccentric wheel is configured to drive the external gear to revolve around the rotation axis of the eccentric wheel,
a limiting disc arranged in the housing, the limiting disc being engaged with the housing so that the limiting disc and the housing are limited to relative movement in a first direction, and the limiting disc being engaged with the external gear so that the limiting disc and the external gear are limited to relative movement in a second direction, wherein the first direction, the second direction, and an axial direction of the limiting disc are orthogonal to each other,
a drive member connected to the eccentric wheel to drive the eccentric wheel to rotate, the drive member having a hole therethrough, and
a positioning shaft connected to a wall of the housing and extending from the wall through the hole of the drive member, the eccentric wheel hole of the eccentric wheel, the external gear through-hole of the external gear, and the internal gear through-hole of the internal gear,
wherein the motor is configured to drive the drive member to rotate, and the swing arm is connected to the internal gear to be driven to swing by the internal gear.

18. A robotic arm, comprising the joint assembly according to claim 10.

19. A robot, comprising the joint assembly according to claim 10.

20. A production system, comprising the robotic arm according to claim 18.

* * * * *